United States Patent
Narumi et al.

(10) Patent No.: US 6,975,571 B1
(45) Date of Patent: Dec. 13, 2005

(54) METHOD FOR OPTICALLY RECORDING INFORMATION AND DEVICE FOR OPTICALLY RECORDING INFORMATION BY THE SAME

(75) Inventors: Kenji Narumi, Osaka (JP); Tetsuya Akiyama, Osaka (JP); Kenichi Nishiuchi, Osaka (JP); Shigeaki Furukawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/936,968

(22) PCT Filed: Mar. 15, 2000

(86) PCT No.: PCT/JP00/01589

§ 371 (c)(1),
(2), (4) Date: Sep. 18, 2001

(87) PCT Pub. No.: WO00/57408

PCT Pub. Date: Sep. 28, 2000

(30) Foreign Application Priority Data

Mar. 19, 1999 (JP) ............................................ 11-075205

(51) Int. Cl.$^7$ ............................................... G11B 5/09
(52) U.S. Cl. ............................... 369/47.53; 369/53.16; 369/53.27; 369/59.12
(58) Field of Search ............................ 369/47.14, 47.5, 369/47.51, 47.52, 47.53, 53.12, 53.13, 53.14, 53.15, 53.16, 53.26, 53.27, 53.35, 53.36, 53.42, 59.12

(56) References Cited

U.S. PATENT DOCUMENTS

| | | |
|---|---|---|
| 5,490,126 A | 2/1996 | Furumiya et al. |
| 5,513,165 A | 4/1996 | Ide et al. |
| 5,841,747 A | 11/1998 | Kubota et al. |
| 6,243,339 B1 * | 6/2001 | Spruit et al. ............. 369/53.13 |
| 6,310,846 B1 * | 10/2001 | Fuji ........................ 369/53.31 |

FOREIGN PATENT DOCUMENTS

| | | |
|---|---|---|
| EP | 0 477 892 | 9/1991 |
| EP | 0 751 509 | 6/1996 |
| EP | 0 802 531 | 4/1997 |
| EP | 0820053 | 1/1998 |
| EP | 0 865 035 | 3/1998 |
| EP | 0851413 | 7/1998 |
| JP | 6-195713 | 7/1994 |
| JP | 6-236553 | 8/1994 |
| JP | 9-63056 | 3/1997 |
| JP | 9-167347 | 6/1997 |
| JP | 2679596 | 8/1997 |
| JP | 11-7645 | 1/1999 |
| JP | 2000-40231 | 2/2000 |

* cited by examiner

*Primary Examiner*—Paul W. Huber
(74) *Attorney, Agent, or Firm*—Merchant & Gould P.C.

(57) ABSTRACT

A method by which, in an optical disk recording and reproducing device, the time required for a test recording performed prior to an actual information recording can be reduced according to characteristics of an optical disk. A random pattern signal is transmitted from a random pattern signal generating circuit 3 and recorded on a test track on an optical disk 1, and a bit error rate of a reproduction signal is measured. Only when a value of the bit error rate is not less than a fixed value, test pattern signals are transmitted from a test pattern signal generating circuit 4 and recorded. An edge timing of a reproduction signal is measured by an edge timing detecting circuit 13. Based on a result of the measurement, edge positions of a front-end pulse and a back-end pulse are corrected.

15 Claims, 11 Drawing Sheets

METHOD FOR OPTICALLY RECORDING INFORMATION AND DEVICE FOR OPTICALLY RECORDING INFORMATION BY THE SAME

This application is a 371 of PCT/JP00/01589, filed Mar. 15, 2000.

TECHNICAL FIELD

The present invention relates to an optical information recording medium such as an optical disk used for optically recording and reproducing information, a method for recording information and an information recording device in which a test recording is performed prior to recording of an information signal for optimization of recording conditions.

BACKGROUND ART

In recent years, media used for optically recording information have been proposed and developed that include an optical disk, an optical card, and an optical tape. Particular attention has been given to an optical disk as a medium that allows large-capacity and high-density recording and reproduction of information.

Among the forms of rewritable optical disks is a phase change optical disk. A recording film used in the phase change optical disk is brought into either an amorphous state or a crystalline state depending on conditions of heating and cooling by a laser beam. There is reversibility between the amorphous state and the crystalline state. The recording film varies in optical constants (refractive index and extinction coefficient) depending on whether the recording film is in the amorphous state or the crystalline state. In the phase change optical disk, these two states are formed selectively on the recording film according to an information signal. As a result of this, optical variations (variations in transmittance or reflectance) are caused and used to perform recording and reproduction of the information signal.

In order to obtain the above two states, an information signal is recorded by the following method. A laser beam (power level Pp) focused by an optical head is irradiated onto a recording film of an optical disk in a pulse-like state (referred to as a recording pulse). A temperature increased beyond the melting point causes the recording film to melt. The melted portion is cooled rapidly as the laser beam passes therethrough and turned into a recording mark (referred to also as a mark) in an amorphous state. The power level Pp is referred to as peak power. On the other hand, when a laser beam (power level Pb, Pb<Pp) is focused to be irradiated onto the recording film, which has such an intensity as to increase the temperature of the recording film to a temperature higher than the crystallization temperature but lower than the melting point, a beam-irradiated part of the recording film is brought into a crystalline state. The power level Pb is referred to as bias power. The peak power and the bias power are referred to as recording power, collectively.

In the foregoing manner, a recording pattern of the recording mark of an amorphous region that corresponds to a recording data signal and a mark non-forming part of a crystalline region (referred to as a space) is formed on a track of the optical disk. By the use of differences in optical characteristics between the crystalline region and the amorphous region, the information signal can be reproduced.

Recently, the mark edge recording (referred to also as the PWM recording) method has been in wider use than before in place of the mark position recording (referred to also as the PPM recording) method. The mark position recording allows only a position of a recording mark itself to have information, while the mark edge recording allows both front and back ends of a recording mark edge to have information, thereby being advantageous in improving recording linear density.

Particularly, in the mark edge recording method, recording is performed in such a manner that a recording pulse generated in recording a long mark is resolved into a plurality of recording pulse trains (referred to as a multiple pulse), and that a first pulse (referred to as a front-end pulse) is made wider than an intermediate pulse and a last pulse (referred to as a back-end pulse). The recording is thus performed with the following in mind. In recording a back part of a mark, a recording film is fed with less heat than that in the case of recording a front part of the mark in consideration of the influence of excess heat transmitted from the front part of the mark. Accordingly, distortion in the shape of the recording mark is reduced, whereby the mark is recorded with increased accuracy.

In the meantime, in view of an optical disk being a replaceable recording medium, a device for recording and reproducing optical disks is required to allow stable recording and reproduction with respect to a plurality of optical disks different from one another. However, even optical disks manufactured under the same conditions may vary from one another in the recording power that is optimum for recording and reproduction due to variations in thermal characteristics attributable to variations caused during manufacturing and changes over time. Further, laser beam power to reach a recording film of an optical disk may vary due to staining on the surface of a substrate of the optical disk and a decrease in transmission efficiency of an optical system and variations in an operating condition of a recording and reproducing device.

Furthermore, in the mark edge recording method, variations in thermal characteristics of an optical disk have an influence on a forming condition of a recording mark itself and the degree of thermal interference among recording marks. That is, even recording marks formed as a result of recording in the same recording pulse waveform vary in shape from one disk to another. Thus, a recording mark edge may shift from an ideal position to cause degradation of a reproduced signal depending on a disk that is used.

Therefore, it is requested to allow a recording mark to be recorded in ideal edge positions irrespective of which disk is used by optimally correcting recording power, a front-end pulse edge position, and a back-end pulse edge position with respect to each disk.

An example of a method for accurately recording and reproducing an information signal by correcting optimum power level of a laser beam, a front-end pulse edge position, and a back-end pulse edge position as described above has been disclosed in JP 2679596 B. In the example, combinations of a length of a recording mark (referred to as a self mark length) and lengths of spaces preceding and following the recording mark (referred to as a preceding space length and a following space length, respectively) are organized into combination tables, and with respect to each element in the combination tables, a front-end pulse edge position or a back-end pulse edge position is corrected.

Furthermore, a method for determining optimum recording power from power dependence of a bit error rate has been disclosed in JP 9(1997)-63056A. Further, the following method has been disclosed in JP 6(1994)-196713 A. Prior to recording of an information signal that is performed in starting up a recording and reproducing device and in introducing an optical disk, a test recording using a data pattern having a certain period of time (referred to as a test pattern) is performed. Then, a test signal as a result of the recording is reproduced, and a resultant reproduction signal is measured to determine a shift amount of a recording mark edge. A front-end pulse edge position and a back-end pulse edge position are corrected accordingly.

However, in the conventional methods described above, in introducing an optical disk, for example, a test recording always results in following the same sequence of steps irrespective of the type of optical disk that is used. Accordingly, when the recording power, the front-end pulse edge position, and the back-end pulse edge position retained as initial values in a recording and reproducing device are optimum with respect to an introduced optical disk, a test recording results in having substantially redundant steps. As a result, it takes much time for the recording and reproducing device to be brought into a state where an information signal actually can be recorded, which has been disadvantageous. Particularly, determining a front-end pulse edge position and a back-end pulse edge position requires many steps of test recording, and thus the time taken to obtain a state where an information signal can be recorded is considerable.

Furthermore, in some cases, even when a front-end pulse edge position and a back-end pulse edge position are corrected during steps of a test recording using a test pattern, the corrected edge positions may not be sufficiently optimum in actual recording of an information signal. As a result, the test recording using a test pattern alone does not allow recording of an actual information signal to be performed with sufficient accuracy, which has been disadvantageous.

Furthermore, in the conventional methods, when recording pulse trains that depend on a mark of an information signal are generated to record information, in some cases, a front part and a back part of a recording mark may be distorted asymmetrically with each other due to variations in thermal characteristics of an optical disk. As a result, a reproduction signal is distorted, so that even when a front-end pulse edge position and a back-end pulse edge position are optimized by a test recording, an information signal can not be recorded with sufficient accuracy, which has been disadvantageous.

DISCLOSURE OF THE INVENTION

This invention is intended to solve the conventional problems as described above. It is an object of the present invention to provide a method for optically recording information that allows recording conditions such as recording power, a front-end pulse edge position, a back-end pulse edge position, a front-end pulse width, and a back-end pulse width to be determined by a short-time test recording.

It is another object of the present invention to provide a method for optically recording information that allows an information signal to be recorded with accuracy by determining recording conditions with increased accuracy through an appropriate test recording.

In order to achieve the aforementioned objects, a first method for optically recording information according to the present invention is a method for optically recording information in which recording and reproduction of information is performed in such a manner that a test recording is performed before recording an information signal on a rewritable optical information recording medium, where based on a front-end pulse edge position predetermined by a combination table of a preceding space length and a self mark length and a back-end pulse edge position predetermined by a combination table of a self mark length and a following space length, a random pattern signal is recorded (a), a jitter or a bit error rate of the random pattern signal after being reproduced is measured (b), it is judged whether a value of the jitter or the bit error rate as a result of the measurement is not less than a fixed value (c), when the value of the jitter or the bit error rate is judged to be not less than the fixed value, first test pattern signals are recorded (d), edge intervals of the first test pattern signals after being reproduced are measured (e), and based on results obtained by measuring the edge intervals, optimum values of the front-end pulse edge position and the back-end pulse edge position are determined (f).

According to this method, the time required to determine a front-end pulse edge position and a back-end pulse edge position can be reduced.

In the first method for optically recording information, preferably, prior to the step (a), based on the front-end pulse edge position and the back-end pulse edge position that are predetermined, a random pattern signal according to predetermined recording power is recorded, a jitter or a bit error rate of the random pattern signal after being reproduced is measured, it is judged whether a value of the jitter or the bit error rate as a result of the measurement is not less than a fixed value, when the value of the jitter or the bit error rate is judged to be not less than the fixed value, second test pattern signals are recorded in such a manner that the front-end pulse edge position and the back-end pulse edge position are set to predetermined values, based on results obtained by reproducing the second test pattern signals, an optimum value of recording power is determined, and then the steps (a) to (1) are performed.

According to this method, not only a front-end pulse edge position and a back-end pulse edge position but also the recording power can be determined optimally.

Furthermore, in the first method for optically recording information, preferably, a random pattern is recorded in such a manner that the optimum values of the front-end pulse edge position and the back-end pulse edge position determined in the step (if are used as initial values, and that at least one of the front-end pulse edge position and the back-end pulse edge position is (are) changed (a-1), a jitter or a bit error rate of a reproduction signal obtained by reproducing the random pattern is measured (b-1), and based on a result obtained by measuring the jitter or the bit error rate, the optimum values of the front-end pulse edge position and the back-end pulse edge position are corrected to be redetermined (c-1).

According to this method, a front-end pulse edge position and a back-end pulse edge position can be corrected so as to conform to an actual information signal, whereby an information signal can be recorded with increased accuracy.

Furthermore, in the first method for optically recording information, preferably, prior to the step (a-1), based on the optimum values of the front-end pulse edge position and the back-end pulse edge position determined in the step (1), a random pattern is recorded, a jitter or a bit error rate obtained by reproducing the random patter is measured, it is judged whether a value of the jitter or the bit error rate as a result of the measurement is not less than a fixed value, and when the value of the jitter or the bit error rate is judged to be not less than the fixed value, the steps (a-1) to (c-1) are performed.

According to this method, with respect to an optical disk in which a front-end pulse edge position and a back-end pulse edge position are corrected sufficiently by recording of the first test pattern alone, the time taken to obtain a state that allows actual recording of an information signal can be reduced.

Furthermore, in the first method for optically recording information, preferably, subsequent to the step (c-1), based on the corrected optimum values of the front-end pulse edge position and the back-end pulse edge position, third test pattern signals are recorded, and based on results obtained by reproducing third test pattern signals, a front-end pulse width and a back-end pulse width are corrected.

According to this method, after a front-end pulse edge position and a back-end pulse edge position are corrected so as to conform to an actual information signal, distortion of a recording mark can be minimized, whereby an information signal can be recorded with increased accuracy.

Furthermore, in the first method for optically recording information, preferably, prior to the step (a), based on the front-end pulse edge position and the back-end pulse edge position that are predetermined, third test pattern signals are recorded, and based on results obtained by reproducing the third test pattern signals, a front-end pulse width and a back-end pulse width are corrected.

According to this method, edge positions of a recording pulse can be determined after minimizing distortion of a recording mark, so that distortion of a reproduction signal is reduced, whereby information can be recorded with increased accuracy.

Furthermore, in the first method for optically recording information, preferably, information indicating the front-end pulse edge position and information indicating the back-end pulse edge position that are prerecorded in a predetermined area on the optical information recording medium are read out and used as initial values, and based on the information, the front-end pulse edge position and the back-end pulse edge position that are predetermined are determined.

According to this method, information that has been read out can be used as initial values of a front-end pulse edge position and a back-end pulse edge position, whereby the time required for a test recording further can be reduced.

Furthermore, in the first method for optically recording information, preferably, the optimum values of the front-end pulse edge position and the back-end pulse edge position are recorded as information in a predetermined area on the optical information recording medium.

According to this method, the next time this medium is introduced in a recording and reproducing device, the redetermined optimum values of the front-end pulse edge position and the back-end pulse edge position can be read out and used as initial values, whereby the time to be required the next time when a test recording is performed can be reduced.

Furthermore, in the first method for optically recording information, preferably, information indicating the recording power prerecorded in a predetermined area on the optical information recording medium is read out and used as an initial value, and based on the information, the predetermined recording power is determined.

According to this method, information that has been read out can be used as an initial value of recording power, whereby the time required for a test recording further can be reduced.

Furthermore, in the first method for optically recording information, preferably, the optimum value of the recording power is recorded as information in a predetermined area on the optical information recording medium.

According to this method, the next time this medium is introduced in a optical recording and reproducing device, the determined optimum value of the recording power can be read out and used as an initial value, whereby the time to be required the next time when a test recording is performed can be reduced.

Moreover, in order to achieve the aforementioned objects, a second method for optically recording information according to the present invention is a method for optically recording information in which recording and reproduction of information is performed in such a manner that a test recording is performed before recording an information signal on a rewritable optical information recording medium, where based on a front-end pulse edge position and a back-end pulse edge position that are predetermined, a random pattern signal is recorded with predetermined recording power (a), a jitter or a bit error rate of the random pattern signal after being reproduced is measured (b), it is judged whether a value of the jitter or the bit error rate as a result of the measurement is not less than a fixed value (c), when the value of the jitter or the bit error rate is judged to be not less than the fixed value, second test pattern signals are recorded (d), and based on results obtained by reproducing the second test pattern signals, an optimum value of the recording power is determined (e).

This method allows the time required to determine the recording power can be reduced.

In the second method for optically recording information, preferably, prior to the step (a), based on the front-end pulse edge position and the back-end pulse edge position that are predetermined, a random pattern signal according to predetermined recording power is recorded, a jitter or a bit error rate of the random pattern signal after being reproduced is measured, it is judged whether a value of the jitter or the bit error rate as a result of the measurement is not less than a fixed value, when the value of the jitter or the bit error rate is judged to be not less than the fixed value, first test pattern signals are recorded in such a manner that the recording power is set to a predetermined value, based on results obtained by reproducing the first test pattern signals, optimum values of the front-end pulse edge position and the back-end pulse edge position are determined, and then the steps (a) to (e) are performed.

According to this method, not only recording power but also a front-end pulse edge position and a back-end pulse edge position can be determined optimally.

Furthermore, in the second method for optically recording information, preferably, a random pattern is recorded in such a manner that the recording power is set to the optimum value determined in the step (e), and that at least one of the front-end pulse edge position and the back-end pulse edge position is (are) changed (a-1), a jitter or a bit error rate obtained by reproducing the random pattern is measured (b-1), and based on a result obtained by measuring the jitter or the bit error rate, the optimum values of the front-end pulse edge position and the back-end pulse edge position are corrected to be redetermined (c-1).

According to this method, a front-end pulse edge position and a back-end pulse edge position can be corrected so as to conform to an actual information signal, whereby an information signal can be recorded with increased accuracy.

Furthermore, in the second method for optically recording information, preferably, prior to the step (a-1), based on the optimum value of the recording power determined in the step (e), a random pattern is recorded, a jitter or a bit error rate obtained by reproducing the random pattern is measured, it is judged whether a value of the jitter or the bit error rate as a result of the measurement is not less than a fixed value, and when the value of the jitter or the bit error rate is judged to be not less than the fixed value, the steps (a-1) to (c-1) are performed.

According to this method, with respect to an optical disk with a front-end pulse edge position and a back-end pulse edge position sufficiently corrected, the time taken to obtain a state that allows actual recording of an information signal can be reduced.

Furthermore, in the second method for optically recording information, preferably, subsequent to the step (c-1), based on the corrected optimum values of the front-end pulse edge position and the back-end pulse edge position, third test pattern signals are recorded, and based on results obtained by reproducing the third test pattern signals, a front-end pulse width and a back-end pulse width are corrected. According to this method, after a front-end pulse edge position and a back-end pulse edge position are corrected so as to conform to an actual information signal, distortion of a recording mark can be minimized, whereby an information signal can be recorded with increased accuracy.

Furthermore, in the second method for optically recording information, preferably, prior to the step (a), based on the front-end pulse edge position and the back-end pulse edge position that are predetermined, third test pattern signals are recorded, and based on results obtained by reproducing the third test pattern signals, a front-end pulse width and a back-end pulse width are corrected.

According to this method, edge positions of a recording pulse can be determined after minimizing distortion of a recording mark, so that distortion of a reproduction signal is reduced, whereby information can be recorded with increased accuracy.

Furthermore, in the second method for optically recording information, preferably, information indicating the recording power prerecorded in a predetermined area on the optical information recording medium is read out and used as an initial value, and based on the information, the predetermined recording power is determined.

According to this method, information that has been read out can be used as an initial value of recording power, whereby the time required for a test recording further can be reduced.

Furthermore, in the second method for optically recording information, preferably, the optimum value of the recording power is recorded as information in a predetermined area on the optical information recording medium.

According to this method, the next time this medium is introduced in a recording and reproducing device, the determined optimum value of the recording power can be read out and used as an initial value, whereby the time to be required the next time when a test recording is performed can be reduced.

Furthermore, in the second method for optically recording information, preferably, information indicating the front-end pulse edge position and information indicating the back-end pulse edge position that are prerecorded in a predetermined area on the optical information recording medium are read out and used as initial values, and based on the information, the front-end pulse edge position and the back-end pulse edge position that are predetermined are determined.

According to this method, information that has been read out can be used as initial values of a front-end pulse edge position and a back-end pulse edge position, whereby errors caused during recording power calculation can be reduced.

In addition, in the second method for optically recording information, preferably, the optimum values of the front-end pulse edge position and the back-end pulse edge position are recorded as information in a predetermined area on the optical information recording medium.

According to this method, the next time this medium is introduced in a recording and reproducing device, the redetermined optimum values of the front-end pulse edge position and the back-end pulse edge position can be read out and used as initial values, whereby the time to be required the next time when a test recording is performed can be reduced.

Moreover, in order to achieve the aforementioned objects, a third method for optically recording information according to the present invention is a method for optically recording information in which recording and reproduction of information is performed in such a manner that a test recording is performed before recording an information signal on a rewritable optical information recording medium, where a random pattern signal is recorded in such a manner that a front-end pulse edge position predetermined by a combination table of a preceding space length and a self mark length and a back-end pulse edge position predetermined by a combination table of a self mark length and a following space length are used as initial values, and that at least either one of the front-end pulse edge position and the back-end pulse edge position is (are) changed (a), a jitter or a bit error rate obtained by reproducing the random pattern is measured (b), and based on a result obtained by measuring the jitter or the bit error rate, the front-end pulse edge position and the back-end pulse edge position that are predetermined are corrected (c).

According to this method, a front-end pulse edge position and a back-end pulse edge position can be corrected so as to conform to an actual information signal, whereby an information signal can be recorded with increased accuracy.

In the third method for optically recording information, preferably, prior to the step (a), based on the front-end pulse edge position and the back-end pulse edge position that are predetermined, a random pattern signal is recorded, a jitter or a bit error rate obtained by reproducing the random pattern is measured, it is judged whether a value of the jitter or the bit error rate is not less than a fixed value, and when the value of the jitter or the bit error rate is judged to be not less than the fixed value, the steps (a) to (c) are performed.

According to this method, with respect to an optical disk in which a front-end pulse edge position and a back-end pulse edge position are corrected sufficiently in their initial states, the time taken to obtain a state that allows actual recording of an information signal can be reduced.

Furthermore, in the third method for optically recording information, preferably, information indicating the front-end pulse edge position and information indicating the back-end pulse edge position that are prerecorded in a predetermined area on the optical information recording medium are read out and used as initial values, and based on the information, the front-end pulse edge position and the back-end pulse edge position that are predetermined are determined.

According to this method, information that has been read out can be used as initial values of a front-end pulse edge position and a back-end pulse edge position, whereby the time required for a test recording further can be reduced.

Furthermore, in the third method for optically recording information, preferably, the front-end pulse edge position and the back-end pulse edge position that have been corrected are recorded as information in a predetermined area on the optical information recording medium.

According to this method, the next time this medium is introduced in a recording and reproducing device, the redetermined optimum values of the front-end pulse edge position and the back-end pulse edge position can be read out and used as initial values, whereby the time to be required the next time when a test recording is performed can be reduced.

Furthermore, in the third method for optically recording information, preferably, a random pattern is recorded in the step (a) in such a manner that either one of the front-end pulse edge position and the back-end pulse edge position is changed, and with respect to a plurality of elements in the combination tables, the steps (a) to (c) are performed repeatedly.

According to this method, the time required to correct a front-end pulse edge position and a back-end pulse edge position can be reduced.

Moreover, in order to achieve the aforementioned objects, a fourth method for optically recording information according to the present invention is a method for optically recording information in which recording and reproduction of information is performed in such a manner that a test recording is performed before recording an information signal on a rewritable optical information recording medium, where based on a front-end pulse edge position predetermined by a combination table of a preceding space length and a self mark length and a back-end pulse edge position predetermined by a combination table of a self mark length and a following space length, third test pattern signals are recorded (a), and based on results obtained by reproducing the third test pattern signals, optimum values of a front-end pulse width and a back-end pulse width are determined (b).

According to this method, distortion of a recording mark attributable to heat characteristics in a scanning direction that vary with each individual optical disk can be minimized, so that distortion of a reproduction signal is reduced, whereby information can be recorded with increased accuracy.

In the fourth method for optically recording information, preferably, subsequent to the step (b), first test pattern signals are recorded, edge intervals of the first test pattern signals after being reproduced are measured, and based on results of the measurement, optimum values of the front-end pulse edge position and the back-end pulse edge position are determined.

According to this method, an edge position of a recording pulse can be determined after minimizing distortion of a recording mark, so that distortion of a reproduction signal is reduced, whereby information can be recorded with increased accuracy.

Furthermore, in the fourth method for optically recording information, preferably, information indicating the front-end pulse width and information indicating the back-end pulse width that are prerecorded in a predetermined area on the optical information recording medium are read out and used as initial values, and based on the information, the front-end pulse width and the back-end pulse width that are predetermined are determined.

According to this method, information that has been read out can be used as initial values of a front-end pulse width and a back-end pulse width, whereby the time required for a test recording further can be reduced.

Furthermore, in the fourth method for optically recording information, preferably, the optimum values of the front-end pulse width and the back-end pulse width that have been determined are recorded as information in a predetermined area on the optical information recording medium.

According to this method, the next time this medium is introduced in a recording and reproducing device, the determined optimum values of the front-end pulse width and the back-end pulse width can be read out and used as initial values, whereby the time to be required the next time when a test recording is performed can be reduced.

Furthermore, in the fourth method for optically recording information, preferably, information indicating the front-end pulse edge position and information indicating the back-end pulse edge position that are prerecorded in a predetermined area on the optical information recording medium are read out and used as initial values, and based on the information, the optimum values of the front-end pulse edge position and the back-end pulse edge position are determined.

According to this method, information that has been read out can be used as initial values of a front-end pulse edge position and a back-end pulse edge position, whereby the time required for a test recording further can be reduced.

Furthermore, in the fourth method for optically recording information, preferably, the optimum values of the front-end pulse edge position and the back-end pulse edge position are recorded as information in a predetermined area on the optical information recording medium.

According to this method, the next time this medium is introduced in a recording and reproducing device, the determined optimum values of the front-end pulse edge position and the back-end pulse edge position can be read out and used as initial values, whereby the time to be required the next time when a test recording is performed can be reduced.

Furthermore, in the fourth method for optically recording information, preferably, in the step (a), the third test pattern signals are recorded in such a manner that either one of the front-end pulse width and the back-end pulse width is changed, and in the step (b), a leading edge jitter and a trailing edge jitter of a reproduction signal obtained by reproducing the third test pattern signals are measured independently, and based on a result obtained by measuring the jitters, the front-end pulse width and the back-end pulse width are corrected.

According to this method, a front-end pulse width and a back-end pulse width can be determined easily.

Furthermore, in the fourth method for optically recording information, preferably, the third test pattern is a single-period signal pattern.

According to this method, a recording pulse width can be determined without being affected by a front-end pulse edge position and a back-end pulse edge position.

Moreover, in the first to fourth methods for optically recording information, preferably, information for identifying a recording and reproducing device in which a test recording has been performed is recorded as information in a predetermined area on the optical information recording medium.

According to this method, the next time this medium is introduced in a recording and reproducing device, it can be judged whether the recording and reproducing device is substantially identical to the recording and reproducing device in which the test recording has been performed, and when the device is judged to be substantially identical, the time to be required the next time when a test recording is performed can be reduced.

Furthermore, in the first to fourth methods for optically recording information, preferably, information for identifying a recording and reproducing device that is prerecorded in a predetermined area on the optical information recording medium is read out, it is judged whether the recording and reproducing device after being identified is substantially identical to a recording and reproducing device in which a test recording is performed, and when the recording and reproducing device after being identified is judged to be substantially identical to the recording and reproducing device in which the test recording is performed, a test recording is skipped with respect to at least one selected from the group consisting of information indicating a front-end pulse edge position and a back-end pulse edge position, information indicating a front-end pulse width and a back-end pulse width, and information indicating recording power.

According to this method, when a recording and reproducing device is substantially identical, the time to be required the next time when a test recording is performed can be reduced.

Moreover, in order to achieve the aforementioned objects, an optical information recording device according to the present invention is an optical information recording device for recording information on an optical information recording medium employing the first to fourth methods for optically recording information, where a test recording is performed and the timing thereof is at least one selected from the group consisting of when the recording and reproducing device is adjusted; when the recording and reproducing device is started up; when a certain time has elapsed after the start-up; when an optical information recording medium is replaced; when a bit error rate of an optical information recording medium exceeds a predetermined value; and when the temperature of an operation environment of the optical information recording device varies.

According to this configuration, performing a test recording when a recording and reproducing device is adjusted can compensate for variation factors caused among optical information recording devices. Further, performing a test recording when an optical information recording device is started up and when a certain time has elapsed after the start-up can compensate for variation factors of the optical information recording device itself. Further, performing a test recording when an optical information recording medium is replaced can compensate for variation factors caused among optical information recording media. Further, performing a test recording when a bit error rate of an optical information recording medium exceeds a predetermined value can compensate for variation factors of the optical information recording medium itself. Furthermore, performing a test recording when temperature of an operation environment varies can compensate for variation factors attributable to temperature dependence of an optical information recording device and an optical information recording medium.

Accordingly, the aforementioned methods have functional effects as listed in the following.

(1) By recording a random pattern and performing a test recording based on test pattern signals for determining an edge position only when a bit error rate of reproduced information has a value higher than a predetermined value, when a front-end pulse edge position and a back-end pulse edge position prerecorded on an optical disk are optimum, unnecessary steps of the test recording are eliminated. Therefore, when a disk is introduced in a recording and reproducing device in which the disk has been introduced before or when the disk is introduced in another recording and reproducing device having equivalent performance to that of the recording and reproducing device in which the disk has been introduced before, the time for a test recording can be reduced.

(2) By initially recording a random pattern and performing a test recording based on test pattern signals for determining recording power only when a bit error rate of reproduced information has a value higher than a predetermined value, when recording power prerecorded on an optical disk is optimum, unnecessary steps of the test recording are eliminated. Therefore, when a disk is introduced in a recording and reproducing device in which the disk has been introduced before or when the disk is introduced in another recording and reproducing device having equivalent performance to that of the recording and reproducing device in which the disk has been introduced before, the time for a test recording can be reduced.

(3) By further recording a random pattern to adjust a front-end pulse edge position and a back-end pulse edge position that have been determined in such a manner that test pattern signals for determining an edge position are recorded, recording pulse conditions can be set so as to conform to an actual information signal, whereby an information signal can be recorded with increased accuracy.

(4) By recording a test pattern for determining a pulse width to adjust an front-end pulse width and a back-end pulse width before determining a front-end pulse edge position and a back-end pulse edge position in such a manner that test pattern signals for determining an edge position are recorded, a pulse width that corresponds to differences in thermal characteristics of each optical disk can be set, whereby an information signal can be recorded with increased accuracy.

BEST MODE FOR CARRYING OUT THE INVENTION

Hereinafter, the present invention will be described by way of embodiments with reference to the appended drawings.

First Embodiment

In this embodiment, a random pattern is recorded initially, and only when a bit error rate of reproduced information has a value higher than a predetermined value, a test recording is performed based on test pattern signals for determining a recording pulse edge position (first test pattern signals). Thus, when initial values of edge positions are optimum, unnecessary steps of a test recording are eliminated.

Figure 1:
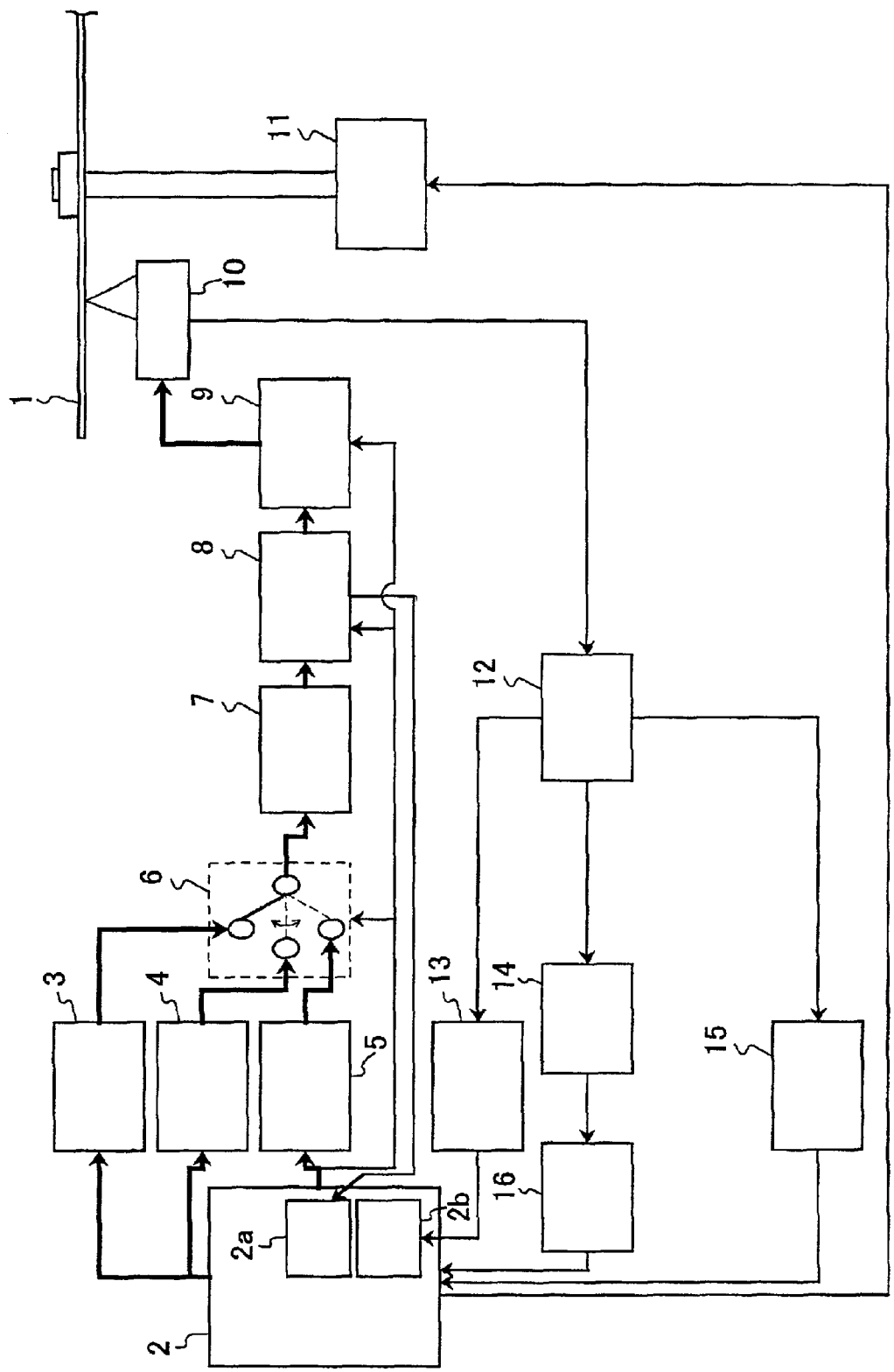
FIG. 1 is a block diagram showing the configuration of a recording and reproducing device according to a first embodiment of the present invention.

FIG. 1 is a block diagram schematically showing the configuration of a recording and reproducing device (an optical information recording device) for realizing a first embodiment.

The recording and reproducing device is a device for recording and reproducing information using an optical disk 1 that includes a spindle motor 11 for rotating the optical disk 1 and an optical head 10 having a laser as a light source (not shown) for focusing laser beams on a desired portion of the optical disk 1. The entire operation of the recording and reproducing device is controlled by a system controlling circuit 2. In the system controlling circuit 2, a table registering memory 2a is provided for registering information of each element in combination tables to correct a front-end pulse edge position that corresponds to a combination of a self mark and a preceding space and a back-end pulse edge position that corresponds to a combination of a self mark and a following space. Further, in the system controlling circuit 2, an edge interval accumulating memory 2b also is provided for accumulating mark edge intervals as results of the measurement to determine correction amounts of a front-end pulse edge position and a back-end pulse edge position.

The recording and reproducing device includes a test pattern signal generating circuit 4 for generating test pattern signals for determining a recording pulse edge position having a certain period of time, a random pattern signal generating circuit 3 for generating a random pattern signal having substantially all patterns based on modulation rules to measure a jitter or a bit error rate, and a modulation circuit 5 for generating a recording data signal that corresponds to an information signal to be recorded.

The recording and reproducing device includes a selecting circuit 6 for switching three kinds of recording data signals transmitted according to a recording mode, a recording signal generating circuit 7 for generating recording pulse trains for driving the laser according to a recording data signal, and a recording pulse edge adjusting circuit 8 for adjusting a front-end pulse edge position and a back-end pulse edge position of recording pulse trains output by the recording signal generating circuit 7. The recording pulse edge adjusting circuit 8 may be a circuit for adjusting edge positions in such a manner that positions of a front-end pulse and a back-end pulse themselves are changed or a circuit for adjusting edge positions in such a manner that a leading edge position of a front end pulse and a trailing edge position of a back-end pulse are changed (where the widths of the front end pulse and the back-end pulse change, respectively).

In addition, a laser-driving circuit 9 is provided for modulating a current for driving the laser as a light source in the optical head 10 according to a recording pulse output by the recording pulse edge adjusting circuit 8.

Furthermore, the recording and reproducing device described above includes a reproduction signal processing circuit 12 for processing a waveform of a reproduction signal based on light reflected from the optical disk 1 as a reproducing part for reproducing information from the optical disk 1, an edge timing detecting circuit 13 for detecting edge timing of a reproduction signal, a demodulating circuit 15 for obtaining reproduction information, a bit error rate (abbreviated as BER in the figure) measuring circuit, and a judging circuit 16 for judging a value of a bit error rate.

Hereinafter, the operation of the recording and reproducing device of this embodiment will be described with reference to a flow chart shown in FIG. 2 and an operational diagram shown in FIG. 3.

Figure 2:
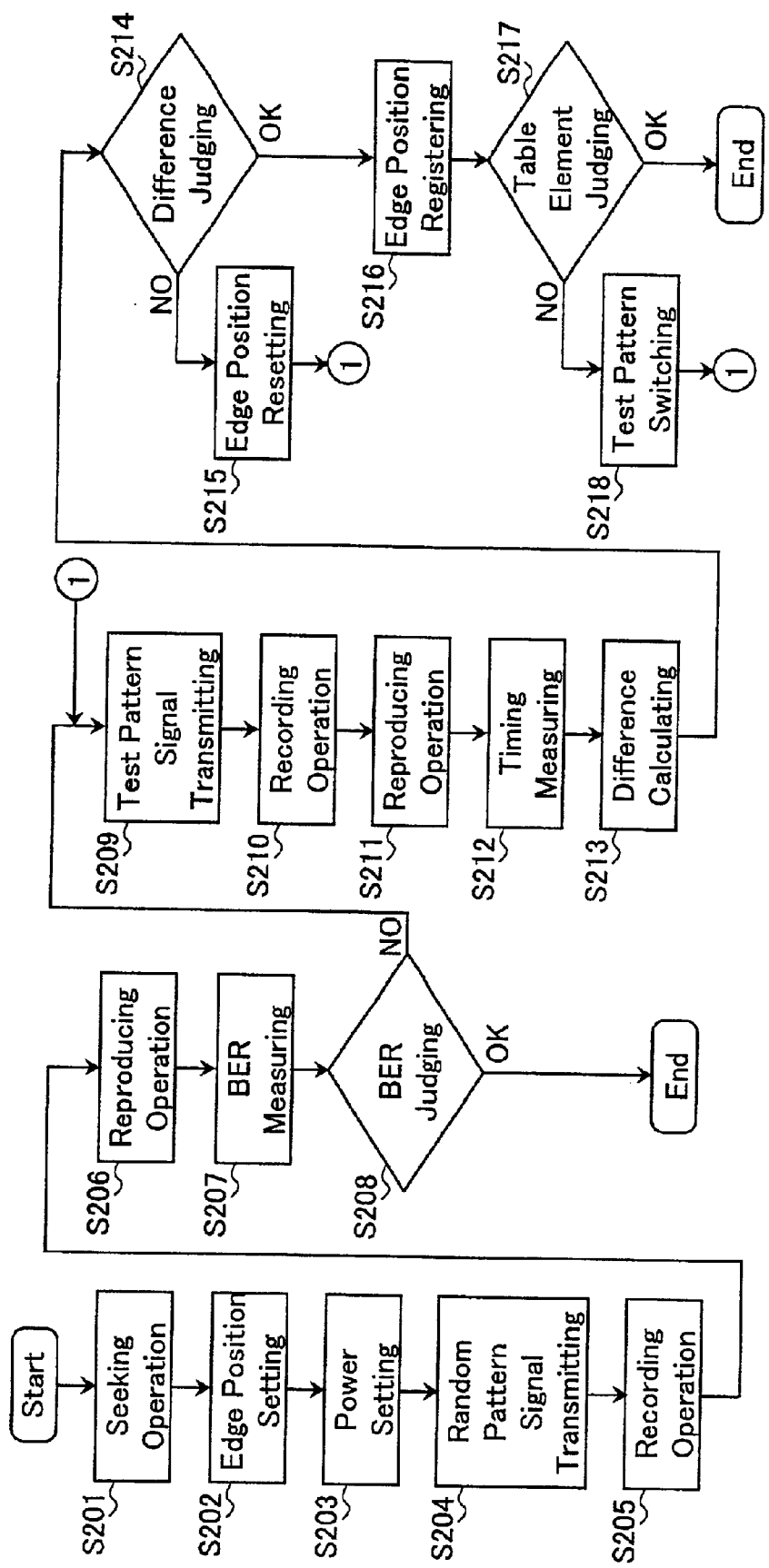
FIG. 2 is a flow chart for explaining the operation of the recording and reproducing device according to the first embodiment of the present invention

FIG. 2 is a flow chart showing the operation of this embodiment. FIG. 3 is a diagram for explaining the operation for determining a correction amount of a front-end pulse edge position according to a combination of a preceding space length 5T and a self mark length 3T (namely, one of elements in the combination tables) as an example of a part of this embodiment, where a reference character T denotes a channel clock period. FIGS. 3(a), 3(b), 3(c), 3(d), and 3(e) are diagrams showing a waveform of test pattern signals for determining a recording pulse edge position (a recording data signal), a waveform of a recording pulse for driving the laser, a state of a track 307 after the test pattern signals for determining a recording pulse edge position are recorded thereon, a waveform of a reproduction signal when the track is reproduced, and a waveform of a binary signal of the reproduction signal, respectively. In FIG. 3, reference characters "M" appended to 3T and 10T, "S" appended to 5T and 10T, "FEP", and "BEP" denote a mark, a space, a front-end pulse edge position, and a back-end pulse edge position, respectively.

In a test recording, initially, according to a seeking operation step Step 201 (hereinafter, steps are abbreviated as, for example, S201), the optical head 10 seeks a predetermined test track on the optical disk 1 based on a command from the system controlling circuit 2. According to an edge position setting step S202, the system controlling circuit 2 sets initial values of a front-end pulse edge position and a back-end pulse edge position (namely, values that have been retained in the recording and reproducing device) with respect to the recording pulse edge adjusting circuit 8 and, according to a power setting step S203, recording power with respect to the laser-driving circuit 9.

Then, according to a random pattern signal transmitting step S204, the selecting circuit 6 is switched so that a random pattern signal from the random pattern signal generating circuit 3 is transmitted to the recording signal generating circuit 7 as a recording data signal.

In a recording operation step S205, the recording signal generating circuit 7 detects how many multiples of a channel clock period T a signal inverting interval of the recording data signal is equivalent to and generates a predetermined number of recording pulse trains with a predetermined width at a predetermined timing according to length of a recording mark. Then, in the recording pulse edge adjusting circuit 8, a front-end pulse edge position and a back-end pulse edge position of the respective recording pulse trains are adjusted to set values, respectively. The laser-driving circuit 9 modulates a current for driving the laser as a light source according to a recording pulse and performs recording on a corresponding track. On the track, a mark is recorded according to a waveform of the random pattern signal.

After the random pattern signal is recorded, according to a reproducing operation step S206, the optical head 10 reproduces the corresponding track, and the reproduction signal processing circuit 12 equalizes a reproduction signal and converts it to a binary signal. According to a BER measuring step S207, the bit error rate measuring circuit 14 compares a pattern of a test signal with a reproduced data pattern based on a waveform of the binary signal and measures a bit error rate.

Then, according to a BER judging step S208, in the judging circuit 16, the bit error rate and a BER prescribed value are judged by comparison, and information indicating a result of the judgment is transmitted to the system controlling circuit 2. The BER prescribed value defines a value of a bit error rate of reproduced information at a usable level. The value is determined in consideration of a recording margin of a recording and reproducing device and an optical disk, or the like.

When the value as a result of the measurement is lower than the BER prescribed value, the test recording is ended. Thus, unnecessary steps of a test recording are eliminated when edge positions prerecorded on an optical disk are optimum. Therefore, when a disk is introduced in a recording and reproducing device in which the disk has been introduced before or when the disk is introduced in another recording and reproducing device having equivalent performance to that of the recording and reproducing device in which the disk has been introduced before, the time for a test recording can be reduced.

When the value as a result of the measurement is higher than the BER prescribed value, for correction of the front-end pulse edge position and the back-end pulse edge position, the following steps are performed.

According to a test pattern signal transmitting step S209, the selecting circuit 6 is switched so that test pattern signals for determining a recording pulse edge position from the test pattern signal generating circuit are transmitted to the recording signal generating circuit 7. The test pattern signals for determining a recording pulse edge position are recording data signals having a certain period of time corresponding to adjustment of each element in the combination tables. The signal has a waveform shown in FIG. 3(a).

According to a recording operation step S210, the recording signal generating circuit 7 converts the recording data signal to recording pulse trains. The laser-driving circuit 9 performs a test recording with respect to a corresponding track in such a manner that a current for driving the laser is modulated based on recording pulse trains shown in FIG. 3(b). The track is brought into a state shown in FIG. 3(c) after the recording.

After the test pattern signals for determining a recording pulse edge position is recorded, according to a reproducing operation step S211, the optical head 10 reproduces the corresponding track. The waveform of a reproduction signal is in a state shown in FIG. 3(d). The reproduction signal processing circuit 12 equalizes the reproduction signal and converts it to a binary signal. The waveform after the conversion to the binary signal is in a state shown in FIG. 3(e). Then, according to a timing measuring step S212, the edge timing detecting circuit 13 slices the binary signal, detects a signal inverting interval, and thereby measures a recording mark edge interval. In the example shown in FIG. 3, an interval x of rising timing of the binary signal shown in FIG. 3(e) is measured. The value of a recording mark edge interval as a result of the measurement is accumulated in the edge interval accumulating memory 2b in the system controlling circuit 2. The system controlling circuit 2 calculates an average of values accumulated in the memory that are obtained by measuring mark edge intervals.

According to a difference calculating step S213, differences (namely, a shift amount of a mark edge) between an average of values of mark edge intervals and edge intervals of the test pattern signals for determining a recording pulse edge position (namely, signal inverting intervals of the test pattern signals for determining a recording pulse edge position) are determined. In the example shown in FIG. 3, a difference between 15T as an ideal signal inverting interval and the interval x is calculated. According to a difference judging step S214, it is judged whether the difference is smaller than a fixed value. As the fixed value in this case, for example, the unit time for adjusting a front-end pulse edge position or a back-end pulse edge position (namely, an adjusting step) in the recording pulse edge adjusting circuit 8 is used.

When the difference is lager than the fixed value, according to an edge position resetting step S215, a front-end pulse edge position or a back-end pulse edge position is determined based on the above difference, and the edge position thus determined is set with respect to the recording pulse edge adjusting circuit 8. In the example shown in FIG. 3, a leading edge position of a recording pulse 301 with a period of 3T is determined (in the example, each recording pulse with a period of 3T is recorded as a single pulse by overlapping a front-end pulse and a back-end pulse). Then, the steps after the step S209 are repeated.

When the difference is smaller than the fixed value, the front-end pulse edge position or the back-end pulse edge position set in the recording pulse edge adjusting circuit 8 is a position closest to a desired position. Therefore, according to an edge position registering step S216, the system controlling circuit 2 registers the edge position that has been set (in the example shown in FIG. 3, the element of a preceding space length 5T and a self mark length 3T for a front-end pulse edge position in the combination tables) as edge position information with respect to the table registering memory 2a in the system controlling circuit 2, and the test recording with respect to the element in the combination tables is thus ended. According to a test pattern switching step S218, after switching to test pattern signals for determining a recording pulse edge position corresponding to an element in the combination tables to be used next, the steps after the step S209 are repeated. According to a table element judging step S217, it is judged whether the steps S209 to S218 have been repeated with respect to all the elements in the combination tables. When setting and registration of edge positions are completed with respect to all the elements, the test recording is ended.

Hereafter, in actual recording of an information signal, the selecting circuit 6 is switched so as to be connected to the modulation circuit 5, and based on an information signal after passing through the modulation circuit 5, a recording pulse is generated. Then, recording is performed according to the front-end pulse edge position and the back-end pulse edge position set in the recording pulse edge adjusting circuit 8, whereby a recording mark can be formed in an ideal position.

This method is employed with the following in mind. When a random pattern signal is recorded, it is not easy to find out an element on the tables that requires correction of an edge position and how much correction is needed for the element by a value of a bit error rate alone. On the other hand, when test pattern signals for determining a recording pulse edge position having a certain period of time are recorded, it is not until shift amounts of edge positions with respect to all test pattern signals are measured that it can be found out whether an information signal actually can be recorded with accuracy.

That is, since random pattern signals include signals of substantially all patterns based on the modulation rules, it is difficult to determine a shift amount of a recording mark edge with respect to a certain combination of a self mark length and a preceding space length or a following space length, while it can be found easily whether information actually can be recorded with accuracy by measuring a jitter or a bit error rate. In contrast to this, when a test recording is performed using a test pattern having a certain period of time, optimum values of a front-end pulse edge position and a back-end pulse edge position can be found out through a shift amount of a recording mark edge determined by measuring a reproduction signal, while it is not until a sequence of test patterns is recorded to measure shift amounts of recording mark edges with respect to all the elements in the combination tables that it can be found out whether information actually can be recorded with accuracy.

As described above, in this embodiment, a random pattern is recorded initially, and only when a bit error rate of reproduced information has a value higher than a fixed value, a test recording is performed based on test pattern signals for determining a recording pulse edge position. Thus, when initial values of a front-end pulse edge position and a back-end pulse edge position retained in a recording and reproducing device are optimum, unnecessary steps of a test recording are eliminated. Therefore, when an optical disk is introduced in a recording and reproducing device in which the disk has been introduced before or when the optical disk is introduced in another recording and reproducing device having equivalent performance to that of the recording and reproducing device in which the disk has been introduced before, the time for a test recording can be reduced. In many cases, however, each individual recording and reproducing device uses the same given optical disk highly frequently. Hence, employing this embodiment can provide a considerable effect of allowing the time for a test recording to be reduced.

Incidentally, in this embodiment, preferably, information indicating a front-end pulse edge position and a back-end pulse edge position is prerecorded on a predetermined track such as a disk managing region on the optical disk 1, and prior to a test recording, the track is reproduced. Based on the information reproduced by the system controlling circuit 2, initial values of the front-end pulse edge position and the back-end pulse edge position are set. This method allows initial values to be set based on information on a front-end pulse edge position and a back-end pulse edge position with respect to each individual optical disk, whereby the time required for a test recording further can be reduced.

Furthermore, in this embodiment, preferably, the front-end pulse edge position and the back-end pulse edge position that are determined after the test recording are re-recorded on a predetermined track such as the disk managing region on the optical disk 1. According to this method, the next time this optical disk is introduced, the front-end pulse edge position and the back-end pulse edge position that have been determined already can be used as initial values, whereby the time to be required for a test recording can be reduced.

Furthermore, in this embodiment, preferably, information indicating recording power is recorded on a predetermined track such as the disk managing region on the optical disk 1, and prior to a test recording, the track is reproduced. Based on the information reproduced by the system controlling circuit 2, an initial value of the recording power is set. This method allows an initial value to be set based on information on recording power with respect to each individual optical disk, whereby the time required for a test recording for determining recording power further can be reduced.

As for transmission of a random pattern signal, the configuration where the system controlling circuit 2 retains random recording information and the recording information is modulated in the modulation circuit 5 allows the random pattern signal generating circuit 3 to be omitted, and thus is more preferable in that a configuration of a recording and reproducing device can be simplified. As an alternative, the configuration where random recording information is transmitted from an external device (such as a computer) connected to the recording and reproducing device of the invention to the system controlling circuit 2 and the recording information is modulated in the modulation circuit 5 also can provide the same effect.

Second Embodiment

Hereinafter, a second embodiment of the present invention will be described. In this embodiment, a random pattern is recorded initially, and only when a bit error rate of reproduced information has a value higher than a predetermined value, a test recording is performed based on test pattern signals for determining recording power (second test pattern signals). Thus, when an initial value of the recording power is optimum, unnecessary steps of a test recording are eliminated.

Figure 4:
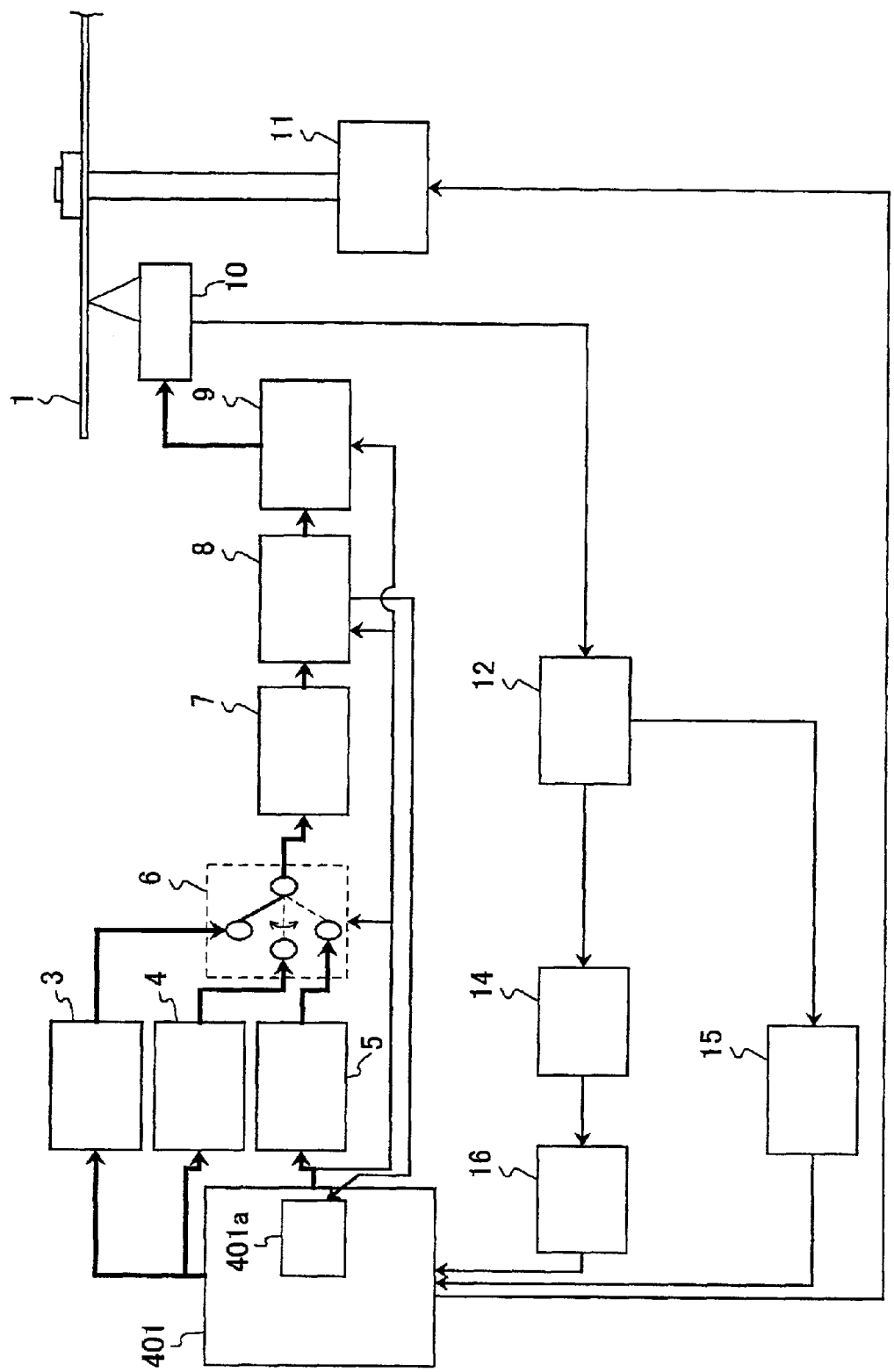
FIG. 4 is a block diagram showing the configuration of a recording and reproducing device according to a second embodiment of the present invention.
Figure 5:
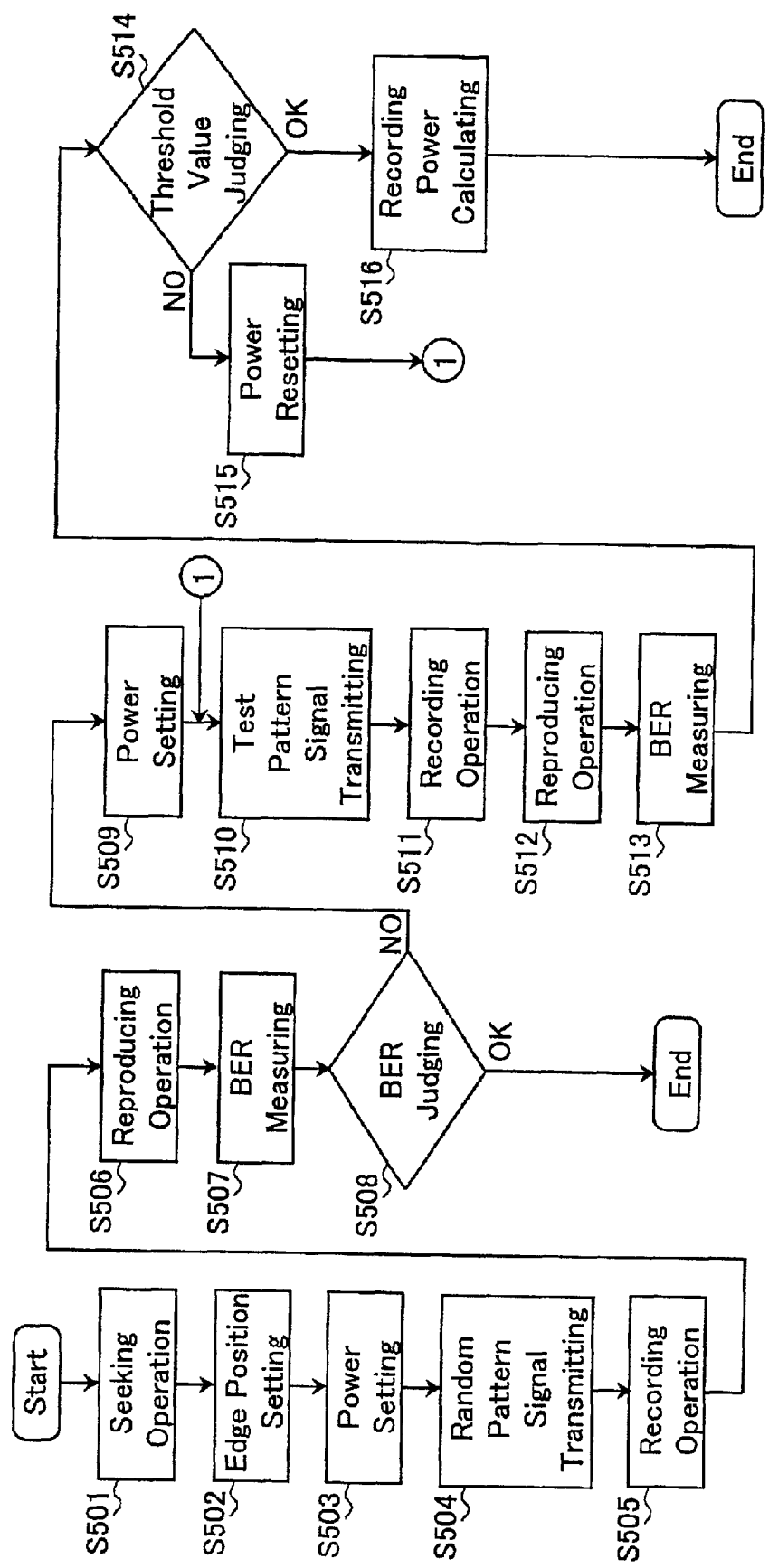
FIG. 5 is a flow chart for explaining the operation of the recording and reproducing device according to the second embodiment of the present invention.

FIG. 4 is a block diagram schematically showing the configuration of a recording and reproducing device (an optical information recording device) for realizing the second embodiment as described above. The recording and reproducing device of this embodiment has the same configuration as that of the first embodiment shown in FIG. 1 except that a recording power registering memory 401a for registering a determined recording power is provided in a system controlling circuit 401 in place of the table registering memory 2a and the edge interval accumulating memory 2b and that the edge timing detecting circuit 13 is not provided. With reference to a flow chart shown in FIG. 5, the operation of the recording and reproducing device of this embodiment controlled by the system controlling circuit 401 will be described in the following.

In a test recording, initially, according to a seeking operation step S501, an optical head 10 seeks a predetermined test track on an optical disk 1 based on a command from the system controlling circuit 401. According to an edge position setting step S502, the system controlling circuit 401 sets initial values of a front-end pulse edge position and a back-end pulse edge position (namely, values that have been retained in the recording and reproducing device) with respect to a recording pulse edge adjusting circuit 8 and, according to a power setting step S503, an initial value of recording power with respect to a laser-driving circuit 9. Then, according to a random pattern signal transmitting step S504, a selecting circuit 6 is switched so that a random pattern signal from a random pattern signal generating circuit 3 is transmitted to a recording signal generating circuit 7 as a recording signal.

According to a recording operation step S505, the recording signal generating circuit 7 detects how many multiples of a channel clock period T a signal inverting interval of the recording data signal is equivalent to and generates a predetermined number of recording pulse trains with a predetermined width at predetermined timing according to length of a recording mark. Then, in the recording pulse edge adjusting circuit 8, edge positions of a front-end pulse and a back-end pulse of the respective recording pulse trains are adjusted to set values, respectively. The laser-driving circuit 9 modulates a current for driving a laser as a light source according to a recording pulse and performs a recording on a corresponding track. On the track, a mark is recorded according to a waveform of the random pattern signal.

After the random pattern signal is recorded, according to a reproducing operation step S506, the optical head 10 reproduces the corresponding track, and a reproduction signal processing circuit 12 equalizes a reproduction signal and converts it to a binary signal. According to a BER measuring step S507, a bit error rate measuring circuit 14 compares a pattern of a test signal and a reproduced data pattern based on a waveform of the binary signal and measures a bit error rate.

Then, according to a BER judging step S508, in a judging circuit 16, the bit error rate and a BER prescribed value are judged by comparison, and information indicating a result of the judgment is transmitted to the system controlling circuit 401. The BER prescribed value defines a value of a bit error rate of reproduced information at a usable level. The value is determined in consideration of a recording margin of a recording and reproducing device and an optical disk, or the like.

When a value as a result of the measurement is lower than the BER prescribed value, the test recording is ended. Thus, unnecessary steps of a test recording are eliminated when edge positions prerecorded on an optical disk are optimum. Therefore, when a disk is introduced in a recording and reproducing device in which the disk has been introduced before or when the disk is introduced in another recording and reproducing device having equivalent performance to that of the recording and reproducing device in which the disk has been introduced before, the time for a test recording can be reduced. The steps described thus far are the same as those of the first embodiment.

When the value as a result of the measurement is higher than the BER prescribed value, the following steps for redetermining recording power are employed. In the steps, a test signal for determining recording power is recorded in such a manner that recording power is changed from low to high, and recording power is determined by determining a threshold value that defines a value of BER of the reproduced test signal being lower than a fixed value. Hereinafter, test recording steps for determining recording power will be described specifically.

According to a power setting step S509, the system controlling circuit 401 sends a command for setting recording power to the minimum value in a power adjustment range to the laser-driving circuit 9. According to a test pattern signal transmitting step S510, the selecting circuit 6 is switched so that test pattern signals for determining recording power from a test pattern signal generating circuit 4 are transmitted to the recording signal generating circuit 7 as a recording data signal.

According to a recording operation step S511, the recording signal generating circuit 7 converts the recording data signal to recording pulse trains. The laser driving circuit 9 performs a test recording with respect to a corresponding track in such a manner that a current for driving the laser is modulated based on the recording pulse trains after passing through the recording pulse edge adjusting circuit 8.

After the test pattern signals for determining recording power are recorded, according to a reproducing operation step S512, the optical head 10 reproduces the corresponding track. The reproduction signal processing circuit 12 equalizes a reproduction signal and converts it to a binary signal. Then, according to a BER measuring step S513, the bit error rate measuring circuit 14 compares a pattern of a test signal with a reproduced data pattern based on a waveform of the binary signal and measures a bit error rate.

Then, according to a threshold value judging step S514, in the judging circuit 16, the bit error rate and a BER threshold value are judged by comparison, and information indicating a result of the judgment is transmitted to the system controlling circuit 401. The BER threshold value defines a value as a reference for calculating optimum recording power. The value is determined in consideration of a recording margin of a recording and reproducing device and an optical disk, or the like.

When a value of the BER is higher than the threshold value, according to a recording power resetting step S515, the system controlling circuit 401 sets the recording power increased by a predetermined amount with respect to the laser-driving circuit 9. Then, the steps after the step S510 are repeated.

When the value of the BER is lower than the threshold value, according to a recording power calculating step S516, the system controlling circuit 401 calculates optimum recording power through the recording power that has been set. Generally, for the calculation, a method is employed in which optimum recording power is determined by multiplying recording power having a BER value lower than the threshold level by a fixed value. Then, the optimum recording power is registered on the recording power registering memory 401a in the system controlling circuit 401 as recording power information, and the test recording with respect to recording power is thus ended.

Hereafter, in the actual recording of an information signal, the selecting circuit 6 is switched so as to be connected to a modulation circuit 5, and based on an information signal after passing through the modulation circuit 5, a recording pulse is generated. Recording is performed based on the recording power registered on the recording power registering memory 401a and according to the recording power set with respect to the laser-driving circuit 9 by the system controlling circuit 401, whereby information can be recorded with an ideal recording power.

As described above, in this embodiment, a random pattern is recorded initially, and only when a bit error rate of reproduced information has a value higher than a fixed value, a test recording is performed based on test pattern signals for determining recording power. Thus, when an initial value of recording power retained in a recording and reproducing device is optimum, unnecessary steps of a test recording are eliminated. Therefore, when an optical disk is introduced in a recording and reproducing device in which the optical disk has been introduced before or when the optical disk is introduced in another recording and reproducing device having equivalent performance to that of the recording and reproducing device in which the optical disk has been introduced before, the time for a test recording can be reduced. In many cases, however, each individual recording and reproducing device uses the same given optical disk highly frequently. Hence, employing this embodiment can provide a considerable effect of allowing the time for a test recording to be reduced.

Furthermore, in this embodiment, preferably, information indicating a front-end pulse edge position and a back-end pulse edge position is prerecorded on a predetermined track such as a disk managing region on the optical disk 1, and prior to a test recording, the track is reproduced. Based on the information reproduced by the system controlling circuit 401, initial values of the front-end pulse edge position and the back-end pulse edge position are set. This method allows initial values to be set based on information on a front-end pulse edge position and a back-end pulse edge position with respect to each individual optical disk. Hence, a test recording for determining recording power can be performed with an edge position having a value closer to an optimum value than an initial value of edge position information retained in a recording and reproducing device. Therefore, errors caused during the recording power calculation due to a shift of a front-end pulse edge position and a back-end pulse edge position from optimum values can be reduced.

Furthermore, in this embodiment, preferably, information indicating recording power is prerecorded on a predetermined track such as the disk managing region on the optical disk 1, and prior to a test recording, the track is reproduced. Based on the information reproduced by the system controlling circuit 401, an initial value of the recording power is set. This method allows an initial value to be set based on information on recording power with respect to each individual optical disk, whereby the time required for a test recording for determining recording power further can be reduced.

Furthermore, in this embodiment, preferably, the recording power determined after the test recording is re-recorded on a predetermined track such as the disk managing region on the optical disk 1. According to this method, the next time this optical disk is introduced, the recording power that has been determined already can be used as an initial value, whereby the time to be required for a test recording can be reduced.

As for transmission of a random pattern signal, the configuration where the system controlling circuit 401 retains random recording information and the recording information is modulated in the modulation circuit 5 allows the random pattern signal generating circuit 3 to be omitted, and thus is more preferable in that a configuration of a recording and reproducing device can be simplified. As an alternative, the configuration where random recording information is transmitted from an external device (such as a computer) connected to the recording and reproducing device of the invention to the system controlling circuit 401 and the recording information is modulated in the modulation circuit 5 also can provide the same effect.

Third Embodiment

Figure 6:
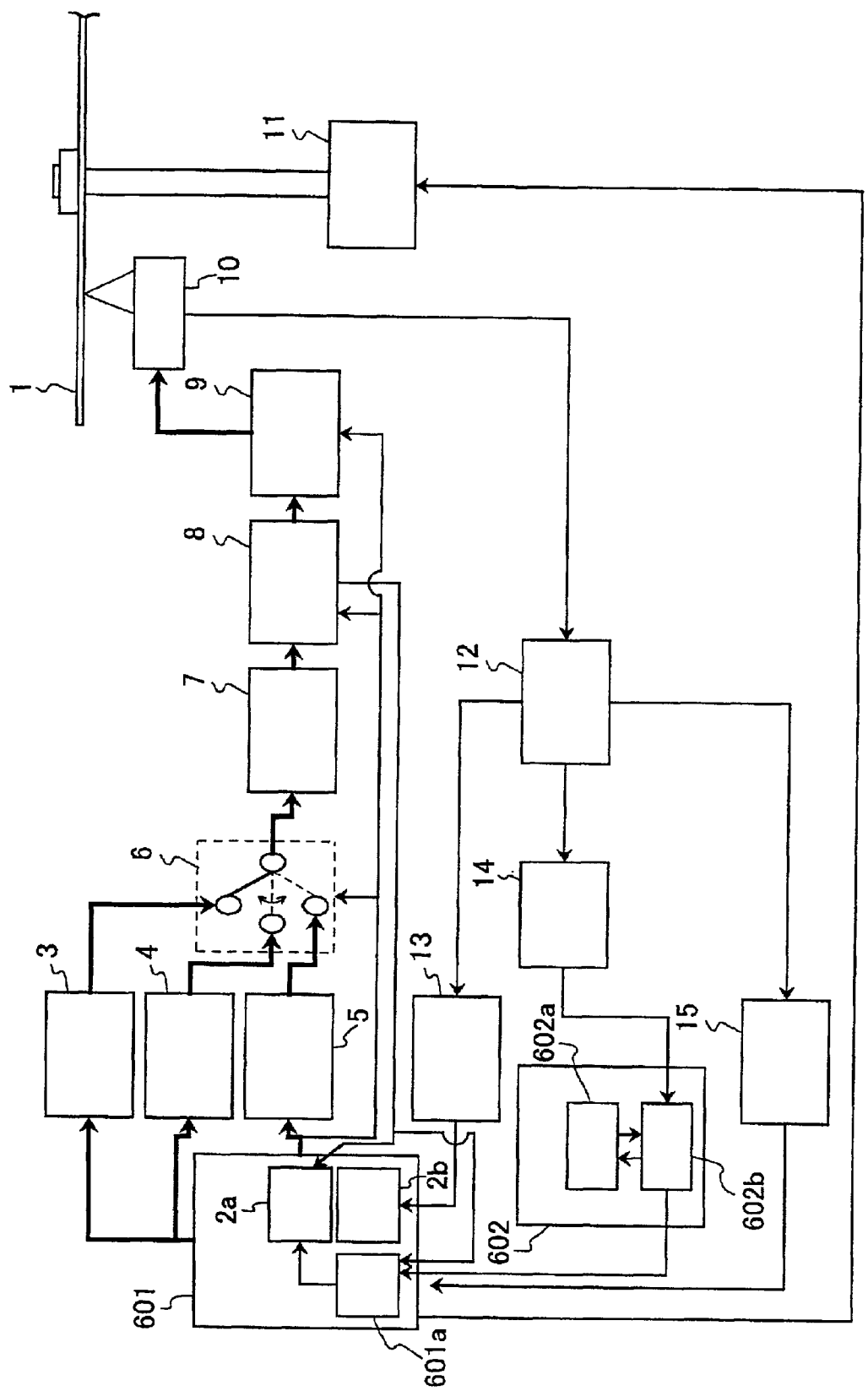
FIG. 6 is a block diagram showing the configuration of a recording and reproducing device according to a third embodiment of the present invention.
Figure 7:
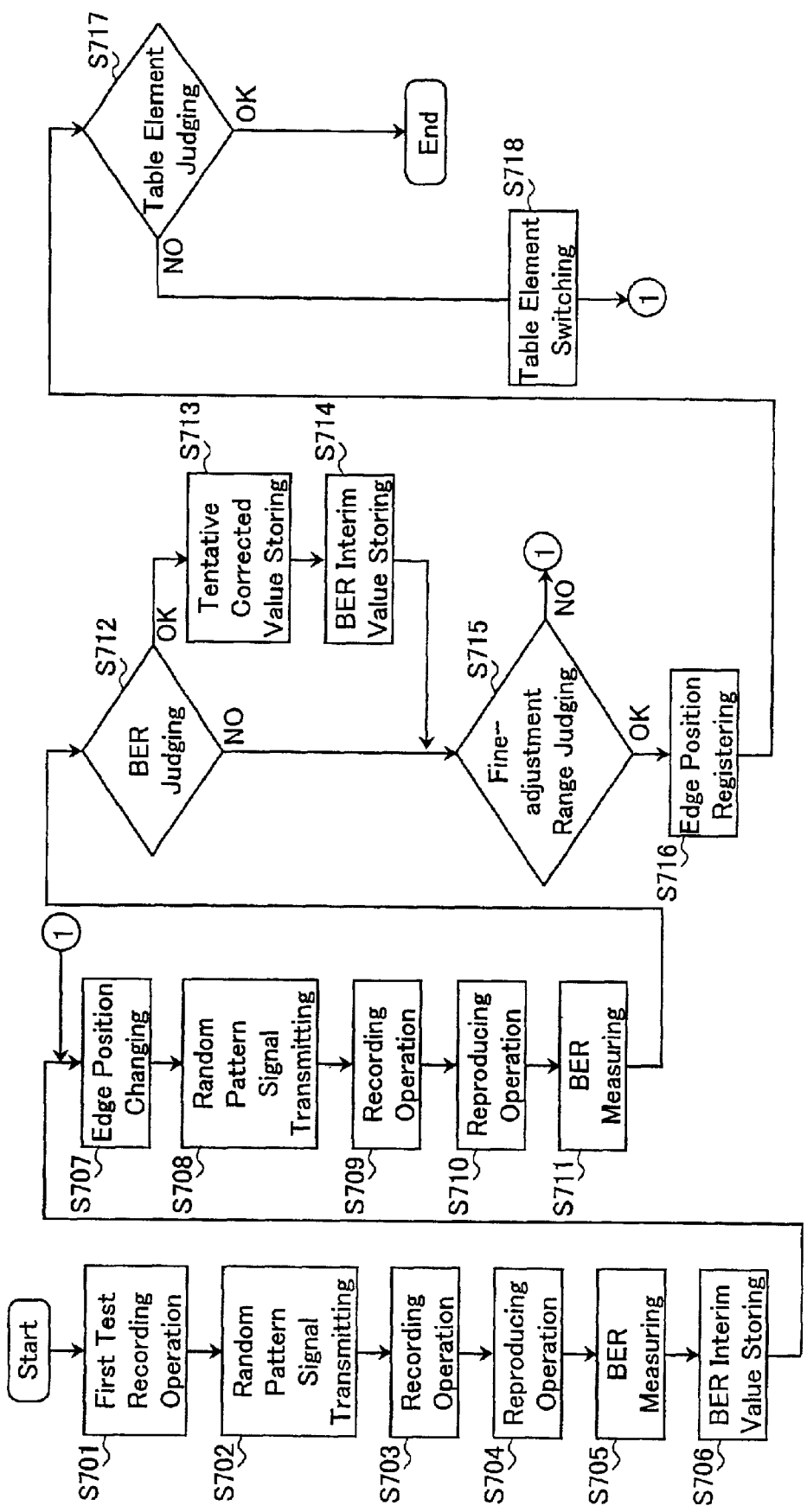
FIG. 7 is a flow chart for explaining the operation of the recording and reproducing device according to the third embodiment of the present invention.

Hereinafter, a third embodiment of the present invention will be described. FIG. 6 is a block diagram schematically showing the configuration of a recording and reproducing device (an optical information recording device) for realizing the third embodiment. The recording and reproducing device of this embodiment has the same configuration as that of the first embodiment shown in FIG. 1 except that a tentative corrected value memory 601a is provided in a system controlling circuit 601 and that a BER comparing circuit 602 including a BER interim value memory 602a and a comparator 602b is provided in place of the judging circuit. With reference to a flow chart shown in FIG. 7, the operation of the recording and reproducing device of this embodiment controlled by the system controlling circuit 601 will be described in the following.

In a test recording, initially, according to a first test recording operation step S701, a front-end pulse edge position and a back-end pulse edge position are determined by the method described in the first embodiment, and the determined edge positions are set with respect to a recording pulse edge adjusting circuit 8. The steps described thus far are the same as the steps S201 to S218 of the first embodiment. At the time of completion of the step S701, the correction of edge positions using a test pattern is optimum with respect to a certain combination of a mark length and a space length included in the test pattern.

However, actual information signals are composed of signals of various patterns based on modulation rules (namely, signals substantially equivalent to a random pattern), and it has been found that, in some cases, they may have edge positions slightly shifted from edge positions determined by a test pattern. Hereinafter, this will be described specifically with reference to FIG. 3.

Figure 3:
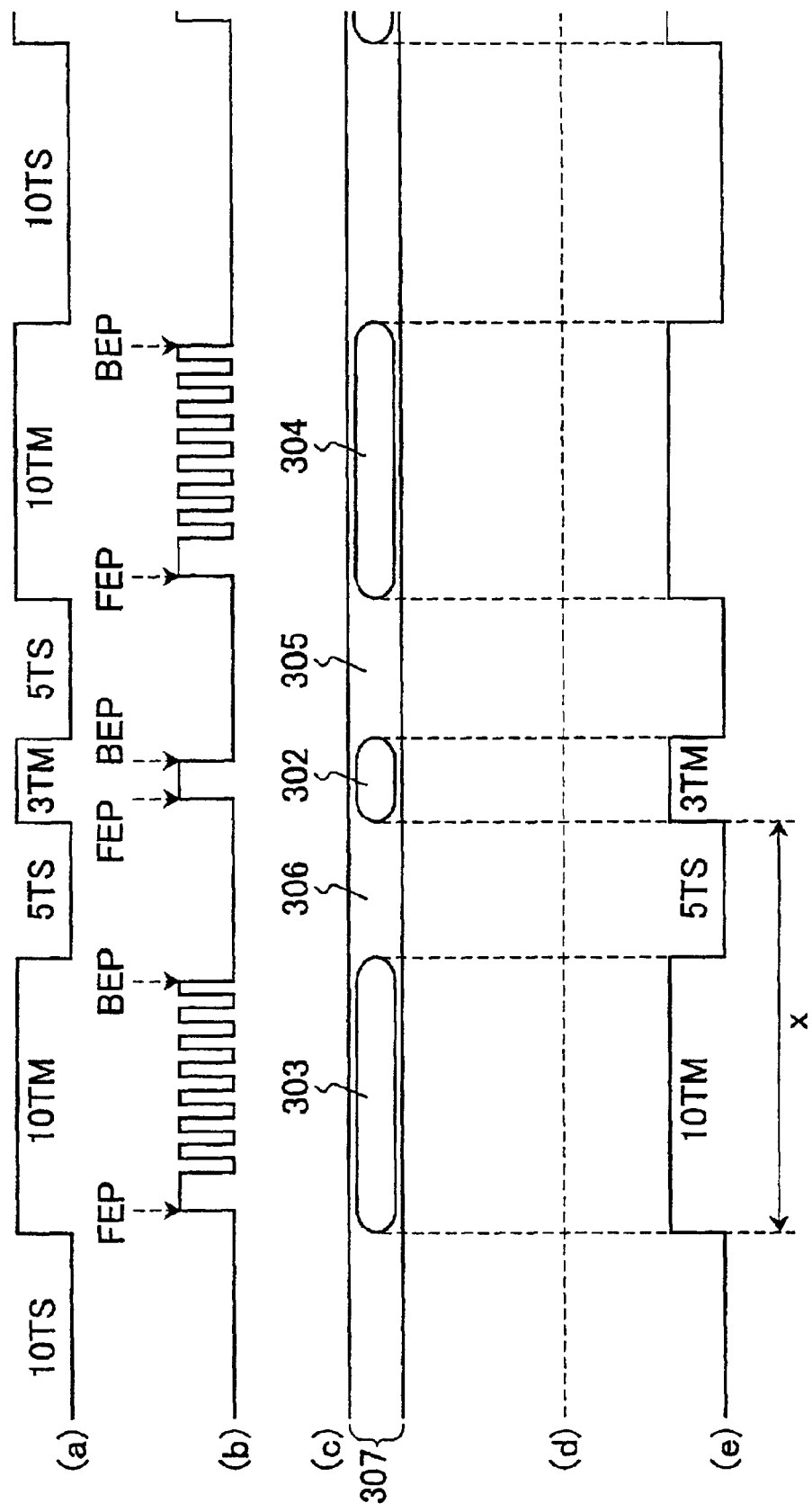
FIGS. 3(a), 3(b), 3(c), 3(d), and 3(e) are diagrams showing a waveform of test pattern signals for determining a recording pulse edge position, a waveform of a recording pulse for driving a laser, a state of a track 307 after recording of the test pattern signals, a waveform of a reproduction signal obtained from the track, and a waveform of a binary signal of the reproduction signal, respectively.

In the case shown in FIG. 3, edge positions of the 3T recording pulse 301 in a combination of a 5T space and a 3T mark (in the example, each recording pulse with a period of 3T is recorded as a single pulse by overlapping a front-end pulse and a back-end pulse) are corrected only in the case of a certain mark—space arrangement of a 10T space, a 10T mark, a 5T space, a 3T mark, a 5T space, a 10T mark (continued). In an actual information signal, however, all mark—space arrangements based on the modulation rules may exist. For example, with respect to a 3T mark with edge positions being corrected, a mark 303 preceding the 3T mark 302 and a mark 304 following the 3T mark 302 may have a period other than 10T, and a space 305 following the 3T mark 302 may have a period other than 5T. The variations of the marks 303 and 304 and the space 305 lead to slight variations in thermal influence given to the 3T mark 302 itself. As a result, an optimum front-end pulse edge position in an actual information signal may be different from an edge position determined by a test pattern. In order to adjust a front-end pulse edge position and a back-end pulse edge position so as to conform to an actual information signal the following steps are performed.

According to a random pattern signal transmitting step S702, a selecting circuit 6 is switched so that a random pattern signal from a random pattern signal generating circuit 3 is transmitted to a recording signal generating circuit 7 as a recording data signal.

According to a recording operation step S703, the recording signal generating circuit 7 detects how many multiples of a channel clock period T a signal inverting interval of the recording data signal is equivalent to and generates a predetermined number of recording pulse trains with a predetermined width at predetermined timing according to the length of a recording mark. In the recording pulse edge adjusting circuit 8, a front-end pulse edge position and a back-end pulse edge position of the respective recording pulse trains are adjusted to set values, respectively. A laser-driving circuit 9 modulates a current for driving a laser as a light source according to the recording pulse trains and performs recording on a corresponding track.

After the random pattern signal is recorded, according to a reproducing operation step S704, an optical head 10 reproduces the corresponding track, and a reproduction signal processing circuit 12 equalizes a reproduction signal and converts it to a binary signal. According to a BER measuring step S705, a bit error rate measuring circuit 14 compares a pattern of a test signal with a reproduced data pattern and measures a bit error rate. Then, according to a BER interim value storing step S706, a value of the bit error rate as a result of the measurement is stored as an interim value in the BER interim value memory 602a in the BER comparing circuit 602.

Next, according to an edge position changing step S707, with respect to an element in the combination tables composed of combinations of a mark length and a preceding and following space lengths, a front-end pulse edge position or a back-end pulse edge position is changed, and the changed edge position is set with respect to the recording pulse edge adjusting circuit 8.

According to a random pattern signal transmitting step S708, the selecting circuit 6 is switched so that a random pattern signal from the random pattern signal generating circuit 3 is transmitted to the recording signal generating circuit 7 as a recording data signal. According to a recording operation step S709, the laser as a light source is driven based on the recording data signal in the same manner as described above, and recording is performed on a corresponding track.

After the recording, according to a reproducing operation step S710, the optical head 10 reproduces the corresponding track and performs reproduction signal processing. According to a BER measuring step S711, a bit error rate is measured.

According to a BER judging step S712, in the comparer 602b in the BER comparing circuit 602, it is judged whether a value of the bit error rate as a result of the measurement is lower than the interim value in the BER interim value memory 602a stored in the step S706. When the value of the bit error rate is lower than the interim value, a front-end pulse edge position (or a back-end pulse edge position) after being changed is more suitable for recording of an actual information signal (equivalent to a random pattern signal) than an edge position before being changed. Thus, according to a tentative corrected value storing step S713, the front-end pulse edge position (or the back-end pulse edge position) is recorded as a tentative corrected value on the tentative corrected value memory 601a in the system controlling circuit 601. Further, according to a BER interim value storing step S714, the value of the bit error rate as a result of the measurement is stored as a new interim value in the BER interim value memory 602a in place of the interim value stored in the step S707. When the value of the bit error rate as a result of the measurement is higher than the interim value, the steps S713 and S714 are not performed.

According to a fine-adjustment range judging step S715, the steps S707 to S714 are repeated in such a manner that a front-end pulse edge position (or a back-end pulse edge position) is changed within an adjustment range of a corresponding element. After all the values in the adjustment range are tested, according to an edge position registering step S716, the tentative corrected value stored in the tentative corrected value memory 601a in the step S713 is determined as a new front-end pulse edge position (or a back-end pulse edge position) and registered on a table registering memory 2a in the system controlling circuit 601. This equates to setting the front-end pulse edge position (or the back-end pulse edge position) of the corresponding element so that a bit error rate has a minimum value. The bit error rate stored in the step S714 is retained. Then, according to a table element switching step S718, the object of edge position change is switched to another element in the tables, and the steps S708 to S716 are repeated likewise. Then, according to a table element judging step S717, it is judged whether adjustment of a front-end pulse edge position (or back-end pulse edge position) is performed with respect to all the elements in the tables. When adjustment and registration of a front-end pulse edge position and a back-end pulse edge position with respect to all the elements in the table are completed, the test recording is ended.

Hereafter, in the actual recording of an information signal, the selecting circuit 6 is switched so as to be connected to a modulation circuit 5, and based on an information signal after passing through the modulation circuit 5, a recording pulse is generated. Recording is performed based on the front-end pulse edge position and the back-end pulse edge position set in the recording pulse edge adjusting circuit 8, whereby a recording mark can be recorded in an ideal edge position.

As described above, in this embodiment, after a front-end pulse edge position and a back-end pulse edge position are determined in such a manner that a test pattern is recorded, and a random pattern signal is further recorded to correct the front-end pulse edge position and the back-end pulse edge position. This allows edge positions to be set so that they conform to an actual information signal, whereby an information signal can be recorded with increased accuracy.

Although in this embodiment, after the first test recording operation step S701, a random pattern signal is always recorded for adjustment of an edge position after the step S707, the following also may be possible. After the BER measuring step S705, the BER comparing circuit 602 judges a bit error rate with a BER prescribed value by comparison, and information indicating a result of the judgment is transmitted to the system controlling circuit 601. It is thus judged whether the steps after the step S707 should be performed. The BER prescribed value defines a value of a bit error rate of reproduced information at a usable level. The value is determined in consideration of a recording margin of a recording and reproducing device and an optical disk, or the like. Based on a result of the judgment, when the value as a result of measurement is lower than the BER prescribed value, a test recording is ended. According to this method, when a value of the BER after completing the first test recording operation step S701 is sufficiently low, the steps after the step S707 can be omitted, whereby the time required for a test recording can be reduced.

Furthermore, in this embodiment, instead of performing the first test recording operation step S701, the following also may be possible. Information indicating a front-end pulse edge position and a back-end pulse edge position is prerecorded on a predetermined track such as a disk managing region on an optical disk 1, and prior to a test recording, the track is reproduced. Based on the information reproduced by the system controlling circuit 601, initial values used in the case where a front-end pulse edge position and a back-end pulse edge position are corrected after the step S702 are given to the recording pulse edge adjusting circuit 8. According to this method, when information on a front-end pulse edge position and a back-end pulse edge position with respect to each individual optical disk is comparatively close to optimum values (that is, when there are few variations in a recording and reproducing device), steps of a test recording using a first test pattern can be omitted, whereby the time required for a test recording further can be reduced.

Furthermore, in this embodiment, preferably, the front-end pulse edge position and the back-end pulse edge position that are determined after the test recording are re-recorded on a predetermined track such as the disk managing region on the optical disk 1. According to this method, the next time this optical disk is introduced, the front-end pulse edge position and the back-end pulse edge position that have been determined already can be used as initial values, whereby the time to be required for a test recording can be reduced.

Furthermore, adjustment does not necessarily have to be performed with respect to all the elements in the combination tables, where a front-end pulse edge position and a back-end pulse edge position are adjusted in such a manner that a random pattern is recorded. For example, a front-end pulse edge position according to an element in a combination table determined by a combination of a mark and a short preceding space is particularly susceptible to thermal interference caused during recording of a preceding mark. Further, a back-end pulse edge position according to an element in a combination table determined by a combination of a mark and a short following space is particularly susceptible to thermal interference caused during recording of a following mark. Therefore, even adjustment performed only with respect to these elements as a part, where a front-end pulse edge position or a back-end pulse edge position is adjusted in such a manner that a random pattern is recorded, can provide an effect of allowing edge positions to be set so that they conform to an actual information signal.

Furthermore, this embodiment may be used as a method for adjusting a front-end pulse edge position and/or a back-end pulse edge position with respect to a plurality of elements at a time. However, when the plurality of elements are adjusted at a time, the number of combinations for adjustment is increased. Thus, the following method is more preferable in that the time required for a test recording can be reduced. A front-end pulse edge position or a back-end pulse edge position is adjusted with respect to each element in the combination tables by changing the front-end pulse edge position or the back-end pulse edge position within a given range.

Fourth Embodiment

Figure 8:
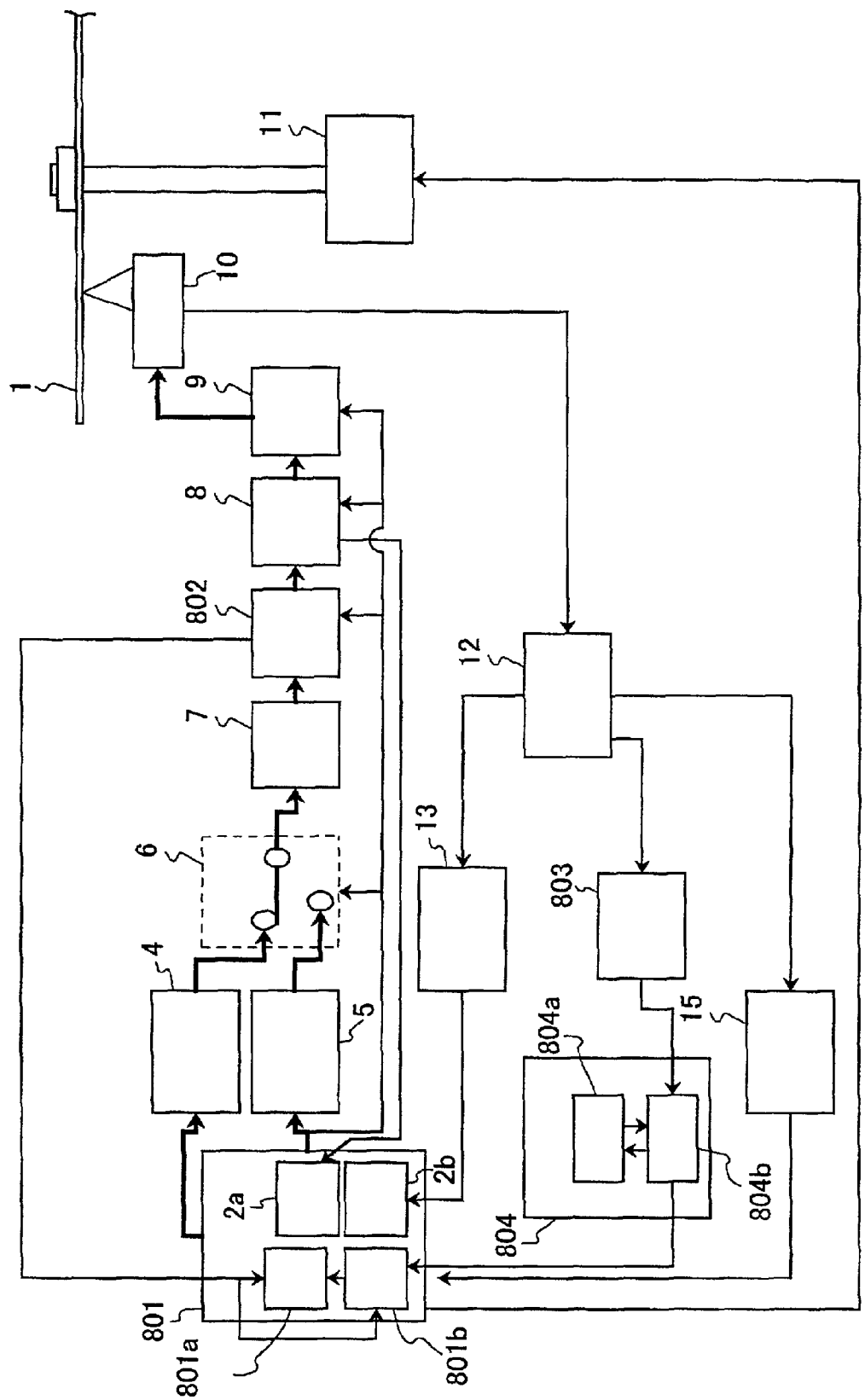
FIG. 8 is a block diagram showing the configuration of a recording and reproducing device according to a fourth embodiment of the present invention.

FIG. 8 is a block diagram schematically showing the configuration of a recording and reproducing device (an optical information recording device) according to a fourth embodiment of the present invention. The recording and reproducing device of this embodiment has the same configuration as that of the first embodiment shown in FIG. 1 except for the following. The random pattern signal generating circuit 3 is not provided. In a system controlling circuit 801, a pulse width registering memory 801a and a tentative corrected value memory 801b are provided. A recording pulse width adjusting circuit 802 is provided to follow a recording signal generating circuit 7. A jitter measuring circuit 803 is used in place of the BER measuring circuit 14. A jitter comparing circuit 804 including a jitter interim value memory 804a and a comparer 804b is provided in place of the judging circuit.

In the conventional test recording, edge positions are adjusted with a front-end pulse width and a back-end pulse width unadjusted. However, it has been found that, in some cases, front and back parts of a recording mark may be distorted asymmetrically with each other depending on a disk even when recorded in the same front-end pulse width and the same back-end pulse width due to variations in thermal characteristics of the disk. Hereinafter, this will be described specifically with reference to FIG. 9.

Figure 9:
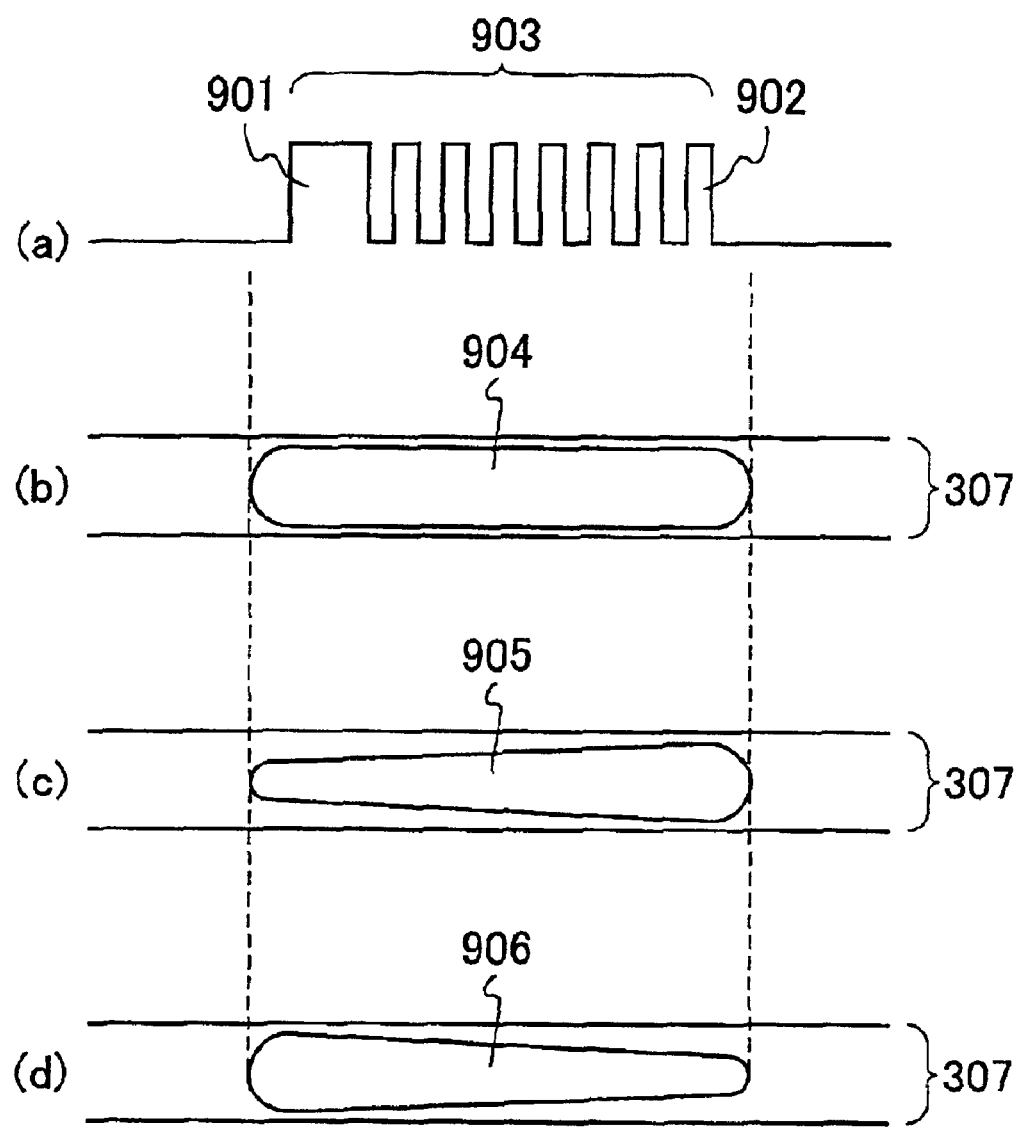
FIGS. 9(a), 9(b), 9(c), and 9(d) are diagrams showing a recording pulse waveform, an optimum recording mark, a recording mark distorted when heat conductivity in a track direction is high, and a recording mark distorted when heat conductivity in the track direction is low, respectively.

FIG. 9 is a diagram showing the relationship between a recording pulse waveform and a recording mark in the conventional methods for recording and reproduction. FIG. 9(a) illustrates a recording pulse waveform, and FIG. 9(b) illustrates a recording mark 904 on a track when recorded in an optimum mark shape. FIGS. 9(c) and 9(d) illustrate recording marks 905 and 906 on a track when recorded in distorted shapes, respectively.

In order to record a mark in the shape of the mark 904 shown in FIG. 9(b), conventionally, a method has been employed in which the width of a front-end pulse 901 in a recording pulse train 903 is made wide and the widths of an intermediate pulse and a back-end pulse 902 are made narrow. However, a pulse width that causes a mark shape not to be distorted varies depending on thermal characteristics of a disk. Therefore, when recording is performed in the same front-end pulse width 901 and the back-end pulse width 902 irrespective of a type of a disk that is used, distortion of a recorded mark occurs differently depending on the disk. For example, when recording is performed on a disk having high heat conductivity in a track direction, a back part of the mark 905 becomes large as shown in FIG. 9(c). On the other hand, when recording is performed on a disk having low heat conductivity in a track direction, a front part of the mark 906 becomes large as shown in FIG. 9(d). A disk on which a mark is recorded in a largely-distorted shape as shown in FIGS. 9(c) and 9(d) leads to increased jitters of a reproduction signal. In order to avoid this, the following method is employed in this embodiment.

Figure 10:
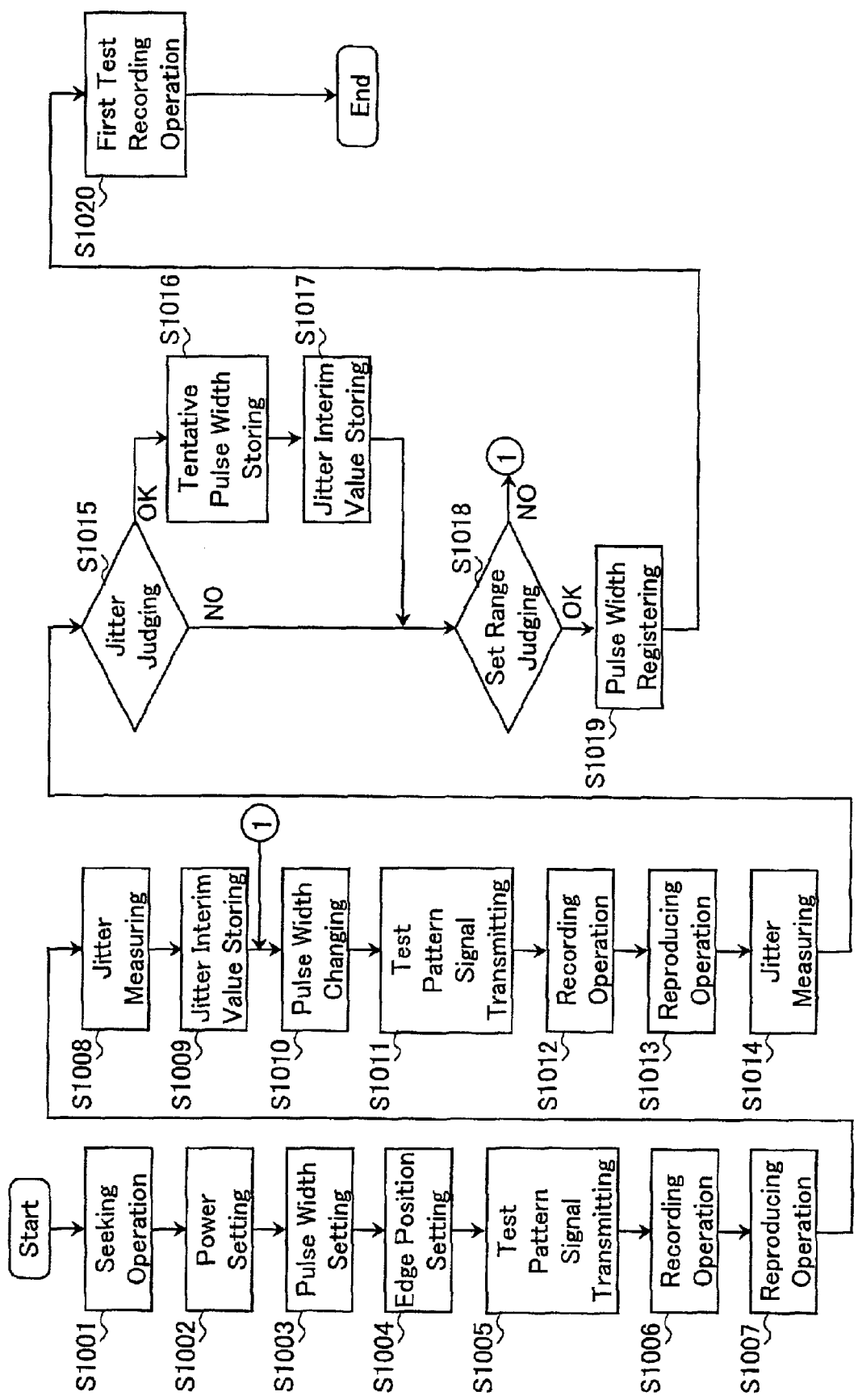
FIG. 10 is a flow chart for explaining the operation of the recording and reproducing device according to the fourth embodiment of the present invention.

Hereinafter, the operation of the recording and reproducing device of this embodiment controlled by the system controlling circuit 801 will be described with reference to a flow chart shown in FIG. 10.

In a test recording, initially, according to a seeking operation step S1001, an optical head 10 seeks a predetermined test track on an optical disk 1. According to a power setting operation S1002, the system controlling circuit 801 sets recording power with respect to a laser-driving circuit 9 and, according to a pulse width setting operation S1003, initial values of a front-end pulse width and a back-end pulse width (namely, values that have been retained in the recording and reproducing device) with respect to the recording pulse width adjusting circuit 802. According to an edge position setting step S1004, the system controlling circuit 801 sets initial values of edge positions with respect to a recording pulse edge adjusting circuit 8. Next, according to a test pattern signal transmitting step S1005, a test pattern signal generating circuit 4 generates test pattern signals for determining a pulse width (third test pattern signals) and transmits them to the recording signal generating circuit 7 as recording data signals. It is preferable that the test pattern signals for determining a pulse width be single-period pattern signals in that a recording pulse width can be determined without being affected by jitters increased due to shift of a front-end pulse edge position and a back-end pulse edge position from optimum values.

According to a recording operation step S1006, the recording signal generating circuit 7 detects how many multiples of a channel clock period T a signal inverting interval of the recording data signal is equivalent to and generates a predetermined number of recording pulse trains with a predetermined width at predetermined timing according to length of a recording mark. In the recording pulse width adjusting circuit 802, widths of a front-end pulse and a back-end pulse in the recording pulse trains are set to initial values, respectively, and in the recording pulse edge adjusting circuit 8, edge positions of the front-end pulse and the back-end pulse in the recording pulse trains are set to initial values, respectively. The laser-driving circuit 9 modulates a current for driving a laser as a light source according to a recording pulse and performs recording on a corresponding track.

After the test pattern signals are recorded, according to a reproducing operation step S1007, the optical head 10 reproduces the corresponding track, and a reproduction signal processing circuit 12 equalizes a reproduction signal and converts it to a binary signal. According to a jitter measuring step S1008, the jitter measuring circuit 803 measures a jitter of mark leading edges and a jitter of mark trailing edges of the reproduction signal. Then, according to a jitter interim value storing step S1009, values of the jitters as results of the measurement are stored as interim values in the jitter interim value memory 804a in the jitter comparing circuit 804.

Next, in a pulse width changing step S1010, the system controlling circuit 801 changes the width of a front-end pulse and/or a back-end pulse and sets a pulse width with respect to the recording pulse width adjusting circuit 802. According to a test pattern signal transmitting step S1011, a selecting circuit 6 is switched so that test pattern signals for determining a pulse width from the test pattern signal generating circuit 4 are transmitted to the recording signal generating circuit 7 as recording data signals. According to a recording operation step S1012, the laser as a light source is driven based on the recording data signal in the same manner as described above, and recording is performed on the corresponding track.

After the recording, according to a reproducing operation step S1013, the optical head 10 reproduces the corresponding track, and according to a jitter measuring step S1014, a jitter is measured after a reproduction signal processing. At this point, according to a jitter judging step S1015, in the comparator 804b in the jitter comparing circuit 804, it is judged whether a value of the jitter as a result of the measurement is lower than the interim value stored in the jitter interim value memory 804a in the step S1009. When the value of the jitter is lower than the interim value, a pulse width after being changed is more suitable than a pulse width before being changed and thus is recorded as a tentative pulse width in the tentative corrected value memory 801b in the system controlling circuit 801. Further, according to a jitter interim value storing step S1017, the value of the jitter as a result of the measurement is stored as a new interim value in the jitter interim value memory 804a in place of the interim value stored in the tentative corrected value memory in the step S1007. When the value of the jitter is higher than the interim value, the steps S1016 and S1017 are not performed.

Figure 11:
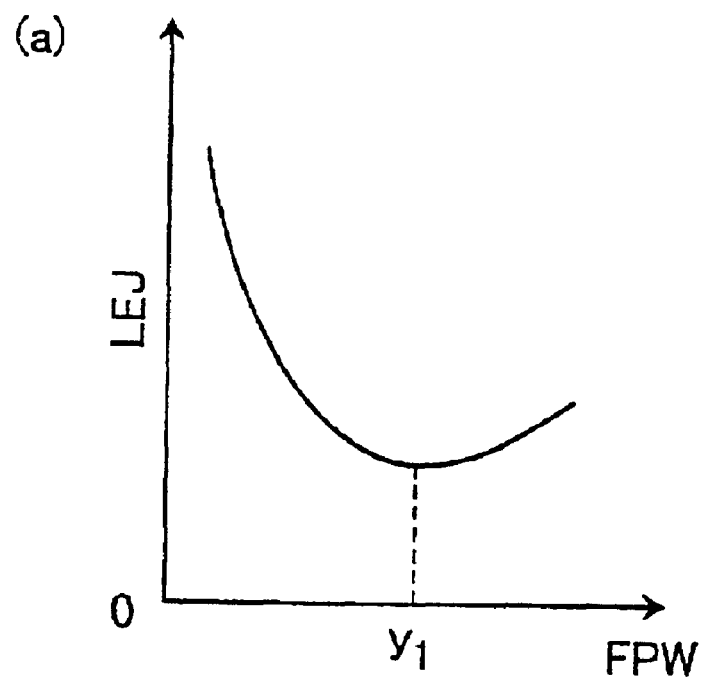
FIGS. 11(a) and 11(b) are graphs showing the relationship between a front-end pulse width (FPW) and a leading edge jitter (LEJ) and the relationship between a back-end pulse width (LPW) and a trailing edge jitter (TEJ), respectively, in a method for recording and reproduction according to the fourth embodiment of the present invention.
Figure 11:
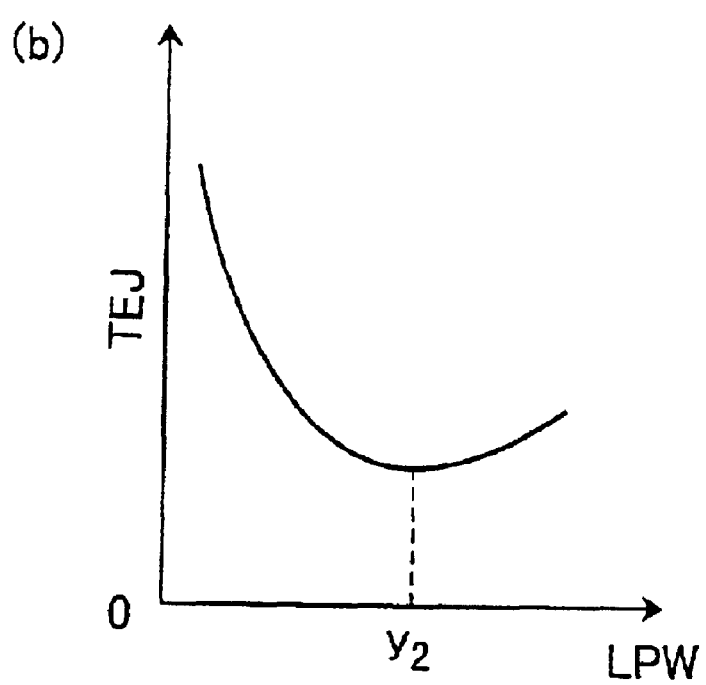

The steps S1010 to S1017 are repeated in such a manner that an edge position is changed within an adjustment range of a corresponding element. According to a set range judging step S1018, it is judged whether all the values in the adjustment ranges have been tested. After all the values in the adjustment ranges are tested, a tentative value of a pulse width stored in the step S1016 is determined as a new pulse width. This equates to setting widths of a front-end pulse and a back-end pulse so that jitters are minimized with respect to test pattern signals. Hereinafter, this will be described specifically with reference to FIG. 11.

FIG. 11(a) is a diagram showing the relationship between a front-end pulse width (FPW) and a jitter of leading edges (LEJ) of a reproduction signal. When a width of a front-end pulse is changed as shown in FIG. 11(a), a shape of a front part of a recording mark varies, whereby a leading edge jitter varies. A decrease in the width of the front-end pulse decreases a heat amount given to the front part of the recording mark. This leads to distortion in shape of the recording mark with the front part made smaller than a back part, thereby increasing increase jitters (that is, the front part of the recording mark can not be recorded stably). An increase in width of the front-end pulse increases a heat amount given to the front part of the recording mark. This leads to distortion in the shape of the recording mark with the front part made larger than the back part, thereby increasing jitters (that is, this equates to recording of the front part of the recording mark with excessive recording power). Therefore, when a width of the front-end pulse is adjusted to y1 so as to minimize jitters, the shape of the front part of the recording mark can be optimized.

FIG. 11(b) is a diagram showing the relationship between a back-end pulse width (LPW) and a jitter of trailing edges (TEJ) of a reproduction signal. When a width of a back-end pulse is adjusted to y2 so as to minimize jitters in the same manner as in the case of the front-end pulse, a shape of a back part of a recording mark can be optimized. As described above, measuring a leading edge jitter and a trailing edge jitter of a reproduction signal allows the influence of widths of a front-end pulse and a back-end pulse to be measured substantially independently. This is more preferable in that each pulse width can be determined easily.

After the foregoing step, according to a first test recording operation step S1020, a font-end pulse edge position and a back-end pulse edge position are set by the method described in the first embodiment and registered. These are the same steps as the steps S201 to S218 of the first embodiment. The test recording is thus ended.

Hereafter, in the actual recording of an information signal, recording is performed according to the front-end pulse width and the back-end pulse width set in the recording pulse width adjusting circuit 802 and the front-end pulse edge position and the back-end pulse edge position set in the recording pulse edge adjusting circuit 8, whereby in actual recording of an information signal, a recording mark free from distortion can be formed in an ideal edge position.

As described above, in this embodiment, prior to determination of an edge position of a recording pulse by recording of a test pattern, a test pattern is recorded to adjust a front-end pulse width and a back-end pulse width. This allows a recording pulse width to be set so that it corresponds to differences in thermal characteristics of each optical disk, whereby an information signal can be recorded with increased accuracy.

Furthermore, in this embodiment, preferably, information indicating a front-end pulse width and a back-end pulse width is prerecorded on a predetermined track such as a disk managing region on the optical disk 1, and prior to a test recording, the track is reproduced. Based on the information reproduced by the system controlling circuit 801, initial values of the front-end pulse width and the back-end pulse width are set. This method allows initial values to be set based on information on a front-end pulse width and a back-end pulse width with respect to each individual optical disk, whereby the time required for a test recording further can be reduced.

Furthermore, in this embodiment, preferably, the front-end pulse width and the back-end pulse width that are determined after the test recording are re-recorded on a predetermined track such as the disk managing region on the optical disk 1. According to this method, the next time this optical disk is introduced, the front-end pulse width and the back-end pulse width that have been determined already can be used as initial values, whereby the time to be required for a test recording can be reduced.

Furthermore, in this embodiment, preferably, information indicating a front-end pulse edge position and a back-end pulse edge position is prerecorded on a predetermined track such as the disk managing region on the optical disk 1, and prior to a test recording, the track is reproduced. Based on the information reproduced by the system controlling circuit 801, initial values of the front-end pulse edge position and the back-end pulse edge position are set. This method allows initial values to be set based on information on a front-end pulse edge position and a back-end pulse edge position with respect to each individual optical disk, whereby the time required for a test recording further can be reduced.

Furthermore, in this embodiment, preferably, the front-end pulse edge position and the back-end pulse edge position that are determined after the test recording are re-recorded on a predetermined track such as the disk managing region on the optical disk 1. According to this method, the next time this optical disk is introduced, the front-end pulse edge position and the back-end pulse edge position that have been determined already can be used as initial values, whereby the time to be required for a test recording can be reduced.

Incidentally, the following is more preferable in that a recording power also can be determined optimally: prior to the first embodiment, moreover as in the second embodiment, a random pattern signal is recorded initially, and only when a bit error rate of reproduced information has a value higher than a fixed value, a test recording is performed based on a test pattern for determining recording power to determine recording power. At this point, more preferably, after the test recording, the determined recording power is re-recorded on a predetermined track such as the disk managing region on the optical disk 1. According to this method, the next time this optical disk is introduced, the recording power that has been determined already can be used as an initial value, whereby the time to be required for a test recording can be reduced.

Furthermore, the following is more preferable in that each edge position also can be determined optimally: prior to the second embodiment, moreover as in the first embodiment, a random pattern signal is recorded initially, and only when a bit error rate of reproduced information has a value higher than a fixed value, a test recording is performed based on test pattern signals for determining an edge position to determine a front-end pulse edge position and a back-end pulse edge position. According to this method, the next time this optical disk is introduced, the front-end pulse edge position and the back-end pulse edge position that have been determined already can be used as initial values, whereby the time to be required for a test recording can be reduced.

Furthermore, the following allows a front-end pulse edge position and a back-end pulse edge position to be determined so that they conform to an actual information signal, whereby an information signal can be recorded with increased accuracy: subsequent to the first embodiment or the second embodiment, moreover as in the third embodiment, a random pattern signal is recorded and a bit error rate thereof is measured; and a front-end pulse edge position and a back-end pulse edge position are determined based on a result of the measurement. Moreover, the following is more preferable in that an information signal can be recorded according to variations in thermal characteristics of each optical disk, thereby providing increased accuracy: subsequent to these embodiments, as in the fourth embodiment, test pattern signals for determining a pulse width are recorded; and a front-end pulse width and a back-end pulse width are adjusted based on results obtained by reproducing the signals.

Furthermore, in the first embodiment, the following is more preferable in that a recording pulse width can be set according to variations in thermal characteristics of each optical disk, whereby an information signal can be recorded with increased accuracy: before recording a test pattern for determining an edge position, moreover as in the fourth embodiment, test pattern signals for determining a pulse width are recorded; and a front-end pulse width and a back-end pulse width are adjusted based on results obtained by reproducing the signals. Moreover, performing the second embodiment prior to these embodiments and the third embodiment subsequent to these embodiments allows recording conditions to be determined substantially perfectly.

Furthermore, in the second embodiment, the following is more preferable in that a recording pulse width can be set according to variations in thermal characteristics of each optical disk, whereby an information signal can be recorded with increased accuracy: before recording test pattern signals for determining an edge position, moreover as in the fourth embodiment, test pattern signals for determining a pulse width are recorded; and a front-end pulse width and a back-end pulse width are adjusted based on a result obtained by reproducing the signal. Moreover, performing the first embodiment prior to these embodiments and the third embodiment subsequent to these embodiments allows recording conditions to be determined substantially perfectly.

Incidentally, in the first to fourth embodiments, preferably, information for identifying a recording and reproducing device in which a test recording has been performed is recorded as information on a predetermined area such as a disk managing region on an optical disk. According to this method, the next time this medium is introduced to a recording and reproducing device, it can be judged whether the recording and reproducing device is substantially identical to the recording and reproducing device in which the test recording has been performed.

When the device is judged to be identical, the time to be required the next time when a test recording is performed can be reduced. When judged to be substantially identical, a recording and reproducing device is the same recording and reproducing device or an equivalent recording and reproducing device for example, a device manufactured by the same manufacturer).

Furthermore, in the first to fourth embodiments, more preferably, information for identifying a recording and reproducing device prerecorded on a predetermined area such as a disk managing region on an optical disk is read out, and it is judged whether the identified recording and reproducing device is substantially identical to a recording and reproducing device in which a test recording is performed. When the identified recording and reproducing device is substantially identical to the recording and reproducing device in which the test recording is performed, a test recording is skipped with respect to at least one selected from the group consisting of information indicating a front-end pulse edge position and a back-end pulse edge position, information indicating a front-end pulse width and a back-end pulse width, and information indicating recording power. According to this method, in the case of a recording and reproducing device that is substantially identical, information indicating a front-end pulse edge position and a back-end pulse edge position, information indicating a front-end pulse width and a back-end pulse width, and information indicating recording power that are read out from an optical disk are used as optimum values, whereby the time to be required the next time when a test recording is performed can be reduced.

Incidentally, in the first to fourth embodiments, the timing desirable for performing a test recording are at least: when a recording and reproducing device is adjusted; when the recording and reproducing device is started; when a certain time has elapsed after the start-up; when an optical disk is replaced; when a bit error rate of the optical disk exceeds a predetermined value; and when the temperature of an operation environment varies.

Performing a test recording when a recording and reproducing device is adjusted can compensate for variation factors caused among recording and reproducing devices. Further, performing a test recording when a recording and reproducing device is started and when a certain time has elapsed after the start-up can compensate for variation factors of the recording and reproducing device itself. Further, performing a test recording when an optical disk is replaced can compensate for variation factors among optical disks. Further, performing a test recording when a bit error rate of an optical disk exceeds a predetermined value can compensate for variation factors of the optical disk itself. Further, performing a test recording when temperature of an operation environment can compensate for variation factors attributable to temperature dependence of a recording and reproducing device and an optical disk.

Furthermore, either in the first embodiment or the third and fourth embodiments, for the purpose of determining an edge position of a recording pulse, a method is employed in which a certain test signal is recorded to measure an edge interval of a recording mark, and a difference between the measured edge interval and an optimum edge interval is adjusted in an edge position adjusting circuit. However, the same effect can be obtained by the following method. Plural kinds of test signals obtained by varying an edge position of a recording pulse in a step-wise manner are recorded, and with respect to the respective test signals, an edge interval of a recording mark is measured. An edge position of a recording pulse in a test signal in which the smallest shift amount of an edge interval is obtained is set with respect to an edge position adjusting circuit as an optimum value.

Furthermore, in the first to fourth embodiments, measurement of an edge interval of a recording mark is performed in an edge timing detecting circuit, and accumulation of values of edge intervals as results of the measurement and calculation of an average value thereof are performed in a system controlling circuit. However, these steps may be performed in a measuring device external to the recording and reproducing device of the invention such as a time interval analyzer.

Furthermore, in the first to third embodiments, for the purpose of generating test pattern signals for determining a pulse edge position, test pattern signals for determining recording power, and test pattern signals for determining a pulse width, there is provided the test signal generating circuit 4 composed of ROM, or the like housing these test pattern signals. However, test pattern signals may be signals obtained by modulating a certain information signal generated from a system controlling circuit. This eliminates the need for separately providing a test signal generating circuit, thereby allowing a device to be reduced in size. Moreover, the test pattern signals may be signals to which an error-correcting code is added, respectively or interleaved signals. A bit error rate may be measured after demodulation or error correction.

Furthermore, as the optical disk described above, any medium can apply the aforementioned methods as long as the medium is a medium in which a recording mark and a mark non-forming part (a space part) vary in optical characteristics such as a phase change material, a magneto-optical material, or a dye material.

Furthermore, obviously, the modulation methods, the lengths and positions of each pulse, the periods of test pattern signals, or the like mentioned above are not limited to those in these embodiments, and it is possible to set optimum ones according to recording conditions or media. Moreover, measurement of a jitter may be substituted for measurement of a bit error rate, and measurement of a bit error rate may be substituted for measurement of a jitter.

What is claimed is:

1. A method for optically recording information in which recording and reproduction of information is performed in such a manner that a test recording is performed before recording an information signal on a rewritable optical information recording medium, wherein based on a front-end pulse edge position predetermined by a combination table of a preceding space length and a mark length and a back-end pulse edge position predetermined by a combination table of a mark length and a following space length, a random pattern signal is recorded (a), a jitter or a bit error rate of the random pattern signal after being reproduced is measured (b), it is judged whether or not a value of the jitter or the bit error rate as a result of the measurement is higher than a fixed value (c), when the value of the jitter or the bit error rate is judged to be higher than the fixed value, first test pattern signals are recorded (d), edge intervals of the first test pattern signals after being reproduced are measured (e), and based on results obtained by measuring the edge intervals, optimum values of the front-end pulse edge position and the back-end pulse edge position are determined (f).

2. The method for optically recording information according to claim 1,
wherein prior to the step (a),
based on the front-end pulse edge position and the back-end pulse edge position that are predetermined, a random pattern signal according to predetermined recording power is recorded,
a jitter or a bit error rate of the random pattern signal after being reproduced is measured,
it is judged whether or not a value of the jitter or the bit error rate as a result of the measurement is higher than a fixed value,
when the value of the jitter or the bit error rate is judged to be higher than the fixed value, second test pattern signals are recorded in such a manner that the front-end pulse edge position and the back-end pulse edge position are set to predetermined values,
based on results obtained by reproducing the second test pattern signals, an optimum value of recording power is determined, and
the steps (a) to (f) are performed.

3. The method for optically recording information according to claim 2,
wherein a random pattern is recorded in such a manner that the optimum values of the front-end pulse edge position and the back-end pulse edge position determined in the step (f) are used as initial values, and that at least one of the front-end pulse edge position and the back-end pulse edge position is (are) changed (a-1),
a jitter or a bit error rate of a reproduction signal obtained by reproducing the random pattern is measured (b-1), and
based on a result obtained by measuring the jitter or the bit error rate, the optimum values of the front-end pulse edge position and the back-end pulse edge position are corrected to be redetermined (c-1).

4. The method for optically recording information according to claim 3,
wherein prior to the step (a-1),
based on the optimum values of the front-end pulse edge position and the back-end pulse edge position determined in the step (f), a random pattern is recorded,
a jitter or a bit error rate obtained by reproducing the random pattern is measured,
it is judged whether or not a value of the jitter or the bit error rate as a result of the measurement is higher than a fixed value, and
when the value of the jitter or the bit error rate is judged to be higher than the fixed value, the steps (a-1) to (c-1) are performed.

5. The method for optically recording information according to claim 4,
wherein subsequent to the step (c-1),
based on the corrected optimum values of the front-end pulse edge position and the back-end pulse edge position, third test pattern signals are recorded, and
based on results obtained by reproducing the third test pattern signals, a front-end pulse width and a back-end pulse width are corrected.

6. The method for optically recording information according to claim 1,
wherein prior to the step (a),
based on the front-end pulse edge position and the back-end pulse edge position that are predetermined, third test pattern signals are recorded, and
based on results obtained by reproducing the third test pattern signals, a front-end pulse width and a back-end pulse width are corrected.

7. The method for optically recording information according to claim 1,
wherein information indicating the front-end pulse edge position and information indicating the back-end pulse edge position that are prerecorded in a predetermined area on the optical information recording medium are read out and used as initial values, and
based on the information, the front-end pulse edge position and the back-end pulse edge position that are predetermined are determined.

8. The method for optically recording information according to claim 7,
wherein information for identifying a recording and reproducing device that is prerecorded in a predetermined area on the optical information recording medium is read out,
it is judged whether or not the recording and reproducing device after being identified is substantially identical to a recording and reproducing device in which a test recording is performed, and
when the recording and reproducing device after being identified is judged to be substantially identical to the recording and reproducing device in which the test recording is performed, a test recording is skipped with respect to information indicating a front-end pulse edge position and information indicating a back-end pulse edge position.

9. The method for optically recording information according to claim 1,
wherein the optimum values of the front-end pulse edge position and the back-end pulse edge position are recorded as information in a predetermined area on the optical information recording medium.

10. The method for optically recording information according to claim 9,
wherein information for identifying a recording and reproducing device in which a test recording has been performed is recorded as information in a predetermined area on the optical information recording medium.

11. The method for optically recording information according to claim 2,
wherein information indicating the recording power prerecorded in a predetermined area on the optical information recording medium is read out and used as an initial value, and
based on the information, the predetermined recording power is determined.

12. The method for optically recording information according to claim 11,
wherein information for identifying a recording and reproducing device that is prerecorded in a predetermined area on the optical information recording medium is read out,
it is judged whether or not the recording and reproducing device after being identified is substantially identical to a recording and reproducing device in which a test recording is performed, and
when the recording and reproducing device after being identified is judged to be substantially identical to the recording and reproducing device in which the test recording is performed, a test recording is skipped with respect to information indicating recording power.

13. The method for optically recording information according to claim 2, wherein the optimum value of the recording power is recorded as information in a predetermined area on the optical information recording medium.

14. The method for optically recording information according to claim 13, wherein information for identifying a recording and reproducing device in which a test recording has been performed is recorded as information in a predetermined area on the optical information recording medium.

15. An optical information recording device for recording information on an optical information recording medium employing the method for optically recording information according to claim 1, wherein a test recording is performed and a timing thereof is at least one selected from the group consisting of: when the recording and reproducing device is adjusted; when the recording and reproducing device is started; when a certain time has elapsed after the start-up; when an optical information recording medium is replaced; when a bit error rate of an optical information recording medium exceeds a predetermined value; and when a temperature of an operation environment of the optical information recording device varies.

* * * * *

UNITED STATES PATENT AND TRADEMARK OFFICE
CERTIFICATE OF CORRECTION

PATENT NO. : 6,975,571 B1  
APPLICATION NO. : 09/936968  
DATED : December 13, 2005  
INVENTOR(S) : Narumi et al.

Page 1 of 1

It is certified that error appears in the above-identified patent and that said Letters Patent is hereby corrected as shown below:

Please add the following references to the Title Page under #56 the FOREIGN PATENT DOCUMENTS heading EP 0 984 441  
EP 1 059 630  
JP 08 287465  
JP 05 234079  
EP 0 446 892  
EP 0 797 193

Signed and Sealed this

Twelfth Day of September, 2006

JON W. DUDAS  
*Director of the United States Patent and Trademark Office*